US008903103B2

(12) United States Patent
Shiba

(10) Patent No.: US 8,903,103 B2
(45) Date of Patent: Dec. 2, 2014

(54) RECEIVING DEVICE, TRANSMITTING DEVICE, RECEIVING METHOD, TRANSMITTING METHOD, AND COMMUNICATION SYSTEM

(75) Inventor: Kenji Shiba, Tokyo (JP)

(73) Assignee: Sony Corporation, Tokyo (JP)

( * ) Notice: Subject to any disclaimer, the term of this patent is extended or adjusted under 35 U.S.C. 154(b) by 316 days.

(21) Appl. No.: 13/402,168

(22) Filed: Feb. 22, 2012

(65) Prior Publication Data

US 2012/0224712 A1 Sep. 6, 2012

(30) Foreign Application Priority Data

Mar. 2, 2011 (JP) ................... 2011-044667

(51) Int. Cl.
*H04B 3/00* (2006.01)
*G11B 20/10* (2006.01)
*G11B 20/00* (2006.01)

(52) U.S. Cl.
CPC .... *G11B 20/10222* (2013.01); *G11B 20/00007* (2013.01)
USPC ............................................ 381/77; 455/420

(58) Field of Classification Search
USPC .................... 381/77; 455/418–420
See application file for complete search history.

(56) References Cited

U.S. PATENT DOCUMENTS

| 5,590,410 A * | 12/1996 | Deutsch et al. ................. 455/76 |
| 6,023,725 A * | 2/2000 | Ozawa et al. ................. 709/219 |
| 6,434,169 B1 * | 8/2002 | Verreault ..................... 370/522 |
| 6,502,138 B2 * | 12/2002 | Hindie et al. ................. 709/231 |
| 2007/0194882 A1 * | 8/2007 | Yokota et al. ................ 340/5.61 |
| 2007/0273515 A1 * | 11/2007 | MacKenzie et al. ........ 340/572.1 |

FOREIGN PATENT DOCUMENTS

JP 2010-288087 A 12/2010

* cited by examiner

*Primary Examiner* — Simon Sing
(74) *Attorney, Agent, or Firm* — Wolf, Greenfield & Sacks, P.C.

(57) ABSTRACT

A receiving device includes a receiving unit receiving a transmission signal of audio data sampled by a first clock from a transmitting device, a received data processing unit selectively executing an asynchronous mode process for executing demodulation of the audio data with respect to the transmission signal received in the receiving unit with a second clock which is asynchronous with the first clock and has the same frequency as the first clock and outputting the demodulated audio data and a re-sampling mode process for performing re-sampling with respect to the audio data obtained from the transmission signal received in the receiving unit and outputting the audio data re-sampled with the second clock, and a control unit controlling the received data processing unit to execute any one of the asynchronous mode process and the re-sampling mode process.

14 Claims, 11 Drawing Sheets

RECEIVING DEVICE, TRANSMITTING DEVICE, RECEIVING METHOD, TRANSMITTING METHOD, AND COMMUNICATION SYSTEM

CROSS REFERENCE TO RELATED APPLICATIONS

The present application claims priority under 35 U.S.C. §119 to Japanese Patent Application No. 2011-044667, filed in the Japan Patent Office on Mar. 2, 2011, the entire contents of which are hereby incorporated by reference.

BACKGROUND

The present disclosure relates to a receiving device, a transmitting device, a receiving method, a transmitting method, and a communication system, and more particularly to a technology in the case where a receiving device and a transmitting device use an asynchronous clock.

In the field of sound reproduction, multi-channelization has been progressed from a two-channel (stereo) such as a related art CD (Compact Disc) to 5.1 channel and 7.1 channel which are seen as a DVD (Digital Versatile Disc) and a BD (Blu-ray Disc (registered trademark)).

Attending on this, sound reproduction with various channel numbers has been performed in accordance with the number of speakers installed in a reproduction system, sound field setting through an AV amplifier or the like, and the number of channels in the reproduction stream itself.

Further, from the hassles of wiring between devices, wireless transmission and reception of audio data have been progressed. For example, in a home theater system, attempts have been made to enhance the degree of freedom of a layout such as a speaker through wireless connection of a transmitting device that transmits audio data and a receiving device such as a speaker that receives the audio data.

In the case of transmitting and processing audio data between a plurality of devices, mainly several methods of a synchronous mode and an asynchronous mode are used as method for suiting a clock that is used in processing the audio data on the receiving side to a sampling frequency on the transmitting side.

Among them, the synchronous mode corresponds to a method in which a transmitting device transmits audio data with a clock component corresponding to a sampling frequency, and a receiving device processes the audio data according to the received clock component.

Further, the asynchronous mode corresponds to a method in which a receiving device processes audio data by generating a clock having the same frequency as a sampling frequency in a transmitting device without using a clock component transmitted from the transmitting device.

SUMMARY

However, in the synchronous mode, the clock on the receiving side may become unstable by the influence of the performance of a PLL circuit (Phase Locked Loop) that extracts a clock component from a reception signal or noise included in the reception signal to degrade the quality of sound deteriorates.

Further, in the asynchronous mode, shift (deviation) between the transmitting side clock and the receiving side clock may occur to cause the occurrence of asynchronous noise.

In Japanese Unexamined Patent Application Publication No. 2010-288087, a method of oversampling received audio data and re-sampling the oversampled audio data with a clock on a receiving side in the case where a transmitting side and the receiving side use an asynchronous clock has been proposed.

However, in the case of performing the re-sampling as described above, a change of sound quality (frequency characteristic) may appear according to the characteristic of a SRC (Sampling Rate Converter) on the receiving device side, and thus the optimum sound reproduction may not be typically performed.

According to the present disclosure, it is desirable to make it possible to perform an appropriate sound output in consideration of a user's status of use on a receiving side when audio data is asynchronously transmitted between a plurality of devices.

According to an embodiment of the present disclosure, there is provided a receiving device which includes a receiving unit receiving a transmission signal of audio data sampled by a first clock from a transmitting device; a received data processing unit selectively executing an asynchronous mode process for executing demodulation of the audio data with respect to the transmission signal received in the receiving unit with a second clock which is asynchronous with the first clock and has the same frequency as the first clock and outputting the demodulated audio data and a re-sampling mode process for performing re-sampling with respect to the audio data obtained from the transmission signal received in the receiving unit and outputting the audio data re-sampled with the second clock; and a control unit controlling the received data processing unit to execute any one of the asynchronous mode process and the re-sampling mode process.

In this case, for example, the switching control of the asynchronous mode process and the re-sampling mode process to the received data processing unit that is performed by the control unit is based on instruction information from the transmitting device, is based on determination of a type of the received audio data, or is performed by adopting a method of taking the received audio data in conjunction with an AGC process.

According to another embodiment of the present disclosure, there is provided a transmitting device which includes a transmitted data processing unit including, in a transmission signal, instruction information that is a switching instruction between an asynchronous mode process for performing modulation of audio data that is sampled with a first clock which is asynchronous with a second clock and has the same frequency as the second clock on a receiving device to generate a transmission signal and performing demodulation of the audio data with the second clock as instruction information to the receiving device side to output the demodulated audio data and a re-sampling mode process for performing re-sampling with respect to the audio data obtained from the received transmission signal and outputting the audio data re-sampled with the second clock; and a transmitting unit transmitting the transmission signal obtained from the transmitted data processing unit to the receiving device.

In this case, for example, the transmission device includes instruction information for determining a type of the transmitted audio data and instructing any one of the asynchronous mode process and the re-sampling mode process in the transmission signal according to the result of the determination. Further, as the instruction information that becomes a switching instruction, instruction information for instructing an on/off operation of the AGC process on the receiving device is included in the transmission signal.

According to still another embodiment of the present disclosure, there is provided a receiving method of a receiving device receiving a transmission signal of audio data sampled by a first clock from a transmitting device using a second clock which is asynchronous with the first clock and has the same frequency as the first clock, which includes selectively executing an asynchronous mode process for executing demodulation of the audio data with respect to the received transmission signal with the second clock and outputting the demodulated audio data and a re-sampling mode process for performing re-sampling with respect to the audio data obtained from the received transmission signal and outputting the audio data re-sampled with the second clock.

According to yet still another embodiment of the present disclosure, there is provided a transmitting method of a transmitting device transmitting audio data sampled by a first clock which is asynchronous with a second clock and has the same frequency as the second clock on a receiving device side to the receiving device, which includes generating a transmission signal including instruction information that is a switching instruction between an asynchronous mode process for performing modulation of audio data that is sampled with the first clock to generate the transmission signal and performing demodulation of the audio data with the second clock as the instruction information to the receiving device side to output the demodulated audio data and a re-sampling mode process for performing re-sampling with respect to the audio data obtained from the received transmission signal and outputting the audio data re-sampled with the second clock.

According to the present disclosure as described above, the receiving device side can selectively execute the asynchronous mode process as the process of the received audio data and the re-sampling mode process using an SRC (Sampling Rate Converter). Further, such switching is performed on the basis of the instruction information from the transmitting device, on the basis of determination of the type of the received audio data, or in conjunction with the AGC process.

Through doing so, it is possible to execute an appropriate receiving process with respect to the audio data according to circumstances.

According to the technology of the present disclosure, it is possible to execute an appropriate receiving process with respect to the audio data on the receiving device side through switching between the asynchronous mode process and the re-sampling mode process. For example, the re-sampling mode process is performed in the situation where asynchronous noise becomes significant, and the asynchronous mode process is performed in the situation where unfavorable changes occur in sound quality to perform an appropriate receiving process.

DETAILED DESCRIPTION OF EMBODIMENTS

Hereinafter, embodiments of the present disclosure will be explained in the following order.

<1. Communication system according to an embodiment>
<2. Explanation of related technology>
<3. Transmitting device according to an embodiment>
<4. Receiving device according to an embodiment>
<5. Mode switching control example I>
<6. Mode switching control example II>
<7. Mode switching control example III>
<8. Mode switching control example IV>

<1. Communication System According to an Embodiment>

Figure 1:
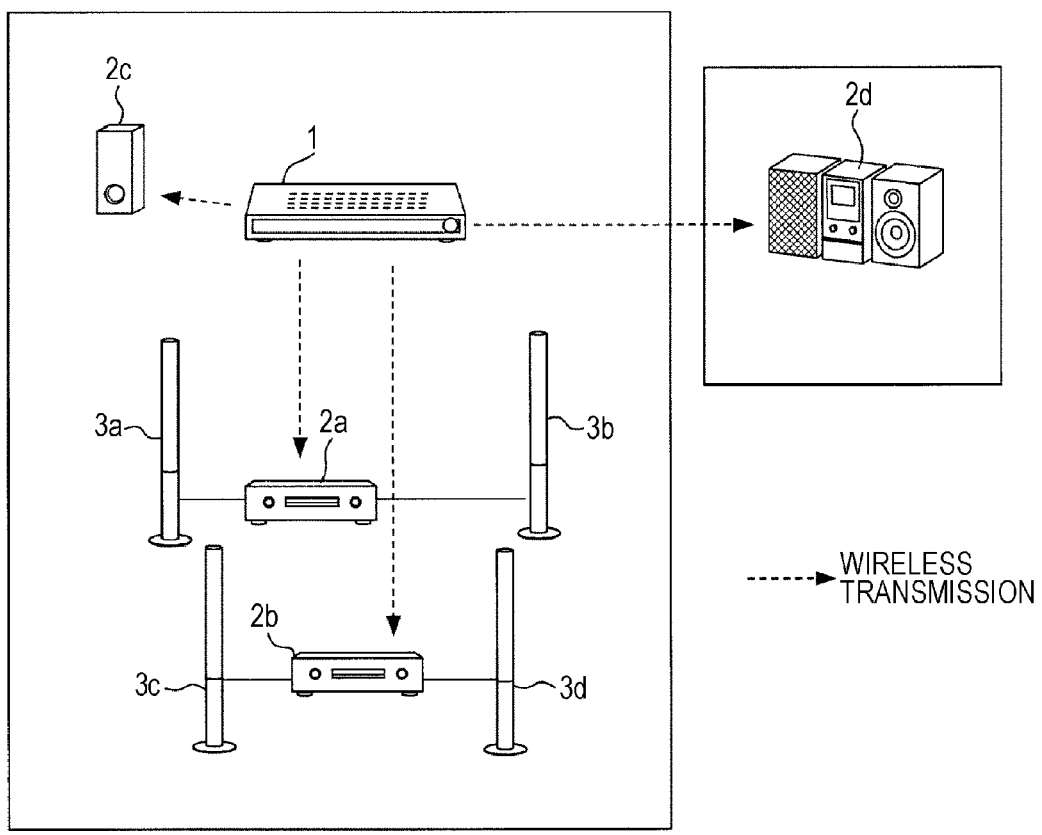
FIG. 1 is an explanatory view of a communication system according to an embodiment.

A configuration example of a communication system according to an embodiment is illustrated in FIG. 1. The communication system according to an embodiment has at least one transmitting device and at least one receiving device.

FIG. 1 shows an example in which a transmitting device 1 (base unit) and a plurality of receiving devices 2 (2a to 2d: extension unit) are provided.

For example, the transmitting device 1 is a device that reads audio data such as music from a recording medium such as CD, DVD, and BD or receives audio data from another communication device, and then transmits the corresponding audio data in a predetermined communication method.

The transmitting device 1 may be one of various kinds of devices that handle audio data as digital data, such as a disc player device, various kinds of music players, a game device, a PC (Personal Computer), a telephone terminal, a television receiver, and a tuner device. The transmitting device 1 may also be in the form of a transmitting unit that is connected to the above-described devices.

Further, the connection between the transmitting device 1 and the receiving devices 2 (2a to 2d) may be a wire connection or a wireless connection.

The receiving device 2 is a device that receives audio data transmitted from the transmitting device 1. FIG. 1 exemplifies a surround rear amplifier 2a, a surround rear back amplifier 2b, a sub-woofer amplifier 2c, and an audio device 2d in another room (second room).

The surround rear amplifier 2a receives and amplifies the audio data transmitted from the transmitting device 1, and outputs the amplified audio data to surround rear speakers 3a and 3b as sound.

The surround rear back amplifier 2b receives and amplifies the audio data transmitted from the transmitting device 1, and outputs the amplified audio data to surround rear back speakers 3c and 3d.

The sub-woofer amplifier 2c receives and amplifies the audio data transmitted from the transmitting device 1, and outputs the amplified audio data to a built-in sub-woofer speaker as sound.

The audio device 2d receives and amplifies the audio data transmitted from the transmitting device 1, and outputs the amplified audio data to the connected speaker as sound.

In the above-described example, the receiving device 2 may be one of diverse devices, such as the above-described amplifier device, a built-in speaker amplifier device, an audio player device, a headphone (earphone) device, a recorder device, a PC, a monitor device, and a telephone terminal.

In the description, devices that receive the audio data from the transmitting device 1 are generally named receiving devices 2.

Here, the audio data transmitted from the transmitting device 1 to the receiving device 2 is data that is sampled according to a clock of a predetermined frequency on the transmitting device 1 side.

For example, the transmitting device 1 transmits the audio data that is sampled with 48 KHz. On the other hand, the receiving device 2 also processes the audio data received with the same clock of 48 KHz.

However, in this example, the transmitting device 1 and the receiving device 2 are asynchronous with each other. That is, although clocks having the same frequency are used, they are not synchronous with each other. Because of this, in a system that performs such audio data transmission/reception, how to process the audio data may cause a problem with respect to the clock discrepancy between the transmitting device 1 and the receiving device 2.

Further, as an example, the clock frequency used in the transmitting device 1 and the receiving device 2 may be set to 48 KHz. For example, the clock frequency may be 44.1 KHz or 32 KHz.

<2. Explanation of Related Technology>

Here, an example of a communication processing method that is considered between the asynchronous transmitting device and receiving device will be described.

Figure 2A:
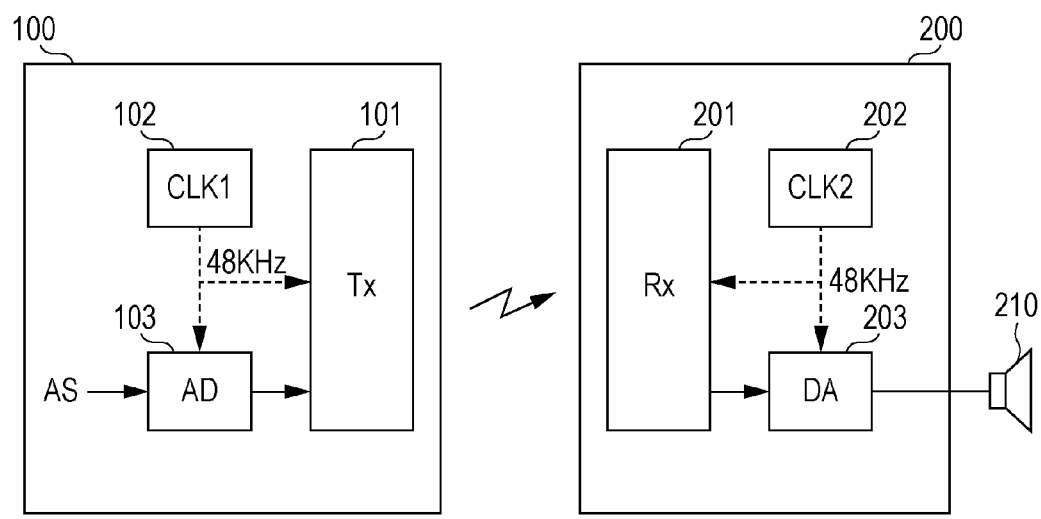
FIGS. 2A and 2B are explanatory diagrams of asynchronous communications.

FIG. 2A schematically illustrates a model in the case where the asynchronous transmitting device 100 and receiving device 200 perform transmission/reception data processing in an asynchronous manner.

In the transmitting device 100 illustrated in FIG. 2A, a clock generation unit 102 generates, for example, a clock CLK1 of 48 KHz. Then, an A/D converter 103 performs sampling of an audio signal AS with the clock CLK1. The audio data from the A/D converter 103 is transmitted by a transmitting system 101.

On the other hand, even in the receiving device 200, a clock generation unit 202 generates a clock CLK2 of 48 KHz. However, this clock is asynchronous with the clock CLK1 of the transmitting device 100. Further, the receiving system 201 demodulates the audio data from the reception signal using the clock CLK1. Further, the receiving system 201 demodulates the audio data from the reception signal using the clock CLK2, and a D/A converter 203 performs digital-to analog conversion using the clock CLK2 and outputs an analog audio signal. This audio signal is output from the speaker 210 as sound.

In such an asynchronous processing model, the clock CLK2 that is used for the receiving side processing is generated by the clock generation unit 202, for example, using a crystal oscillator having a relatively small error. However, even in this case, between the frequency of the clock CLK2 on the receiving side and the sampling frequency (clock CLK1) on the transmitting side, for example, there may be somewhat a difference, that is, a deviation, depending on the degree of individual differences in the oscillator. The clock deviation between the transmitting side and the receiving side in such an asynchronous mode may be sensed by a user as an asynchronous noise in the sound.

Figure 2B:
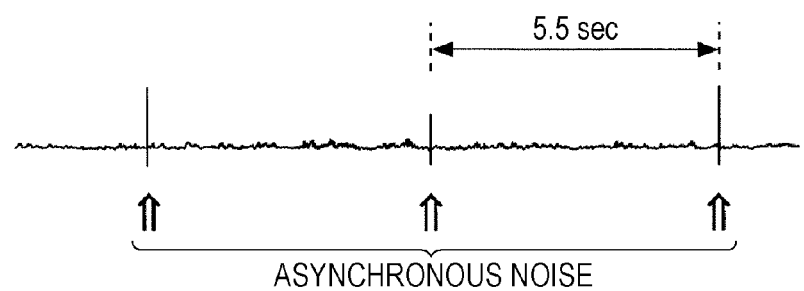

FIG. 2B shows an asynchronous noise that occurs in about once every few seconds (for example, 5.5 seconds) due to a slight deviation of such a clock.

Although this asynchronous noise is almost imperceptibly audible to the user when playing music, it become relatively noticeable noise if a single sound is output by the audio data of a sin wave.

However, in the case of such an asynchronous process, there is almost no change of sound quality (frequency characteristic), and it is suitable in terms of fidelity playback of audio signals.

Figure 3A:
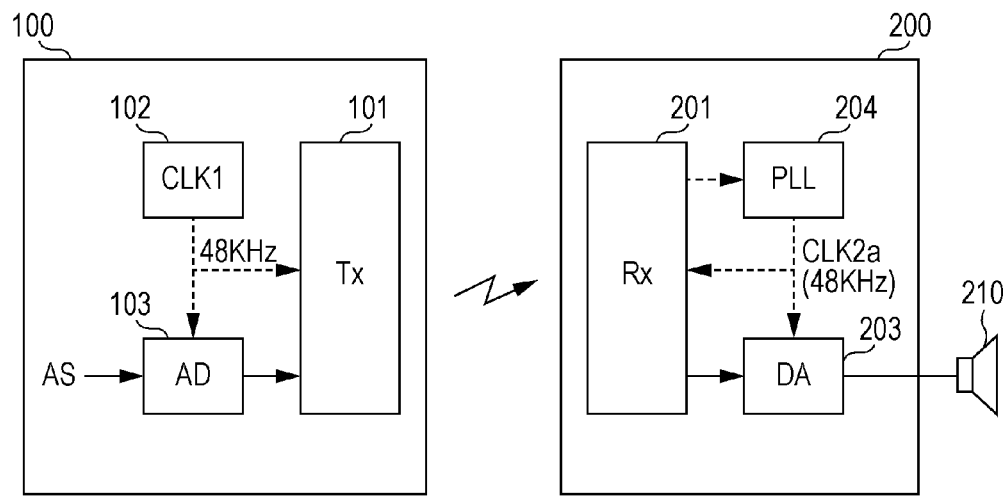
FIGS. 3A and 3B are explanatory diagrams in the case of adopting PLL synchronization between asynchronous devices and in the case of performing re-sampling.

Next, FIG. 3A shows a model that performs a PLL synchronization process.

The transmitting device 100 side is the same as that illustrated in FIG. 2A, and for example, audio data that is sampled with the clock CLK1 of 48 KHz is transmitted.

In the receiving device 200, a receiving system 201 amplifies the received wireless signal, and converts the amplified signal into a baseband signal. A PLL circuit 204 generates a clock CLK2a through extraction of a clock component that is included in the baseband signal, and supplies the generated clock CLK2a to the receiving system 201 and a D/A converter 203.

The receiving system 201 demodulates and extends the baseband signal according to the click CLK2a, and outputs audio data. Further, the D/A converter 203 converts the audio data (a digital signal) into an analog signal according to the clock CLK2a, and outputs the audio data to a speaker 210.

The clock CLK2a used for processing on the receiving side is generated by a PLL circuit 204 according to the clock component that is included in the audio data sampled on the transmitting side. Accordingly, the clock CLK2a may become unstable depending on the performance of the PLL circuit 204 and the influence of the noise included in the reception signal. Because of this, in the sound that is reproduced after being processed in the synchronous mode, the quality degradation such as jitter may be sensed.

Further, the clock of the D/A converter 203 may become unstable in synchronization with the received data, and the sound quality may become disadvantageous.

Figure 3B:
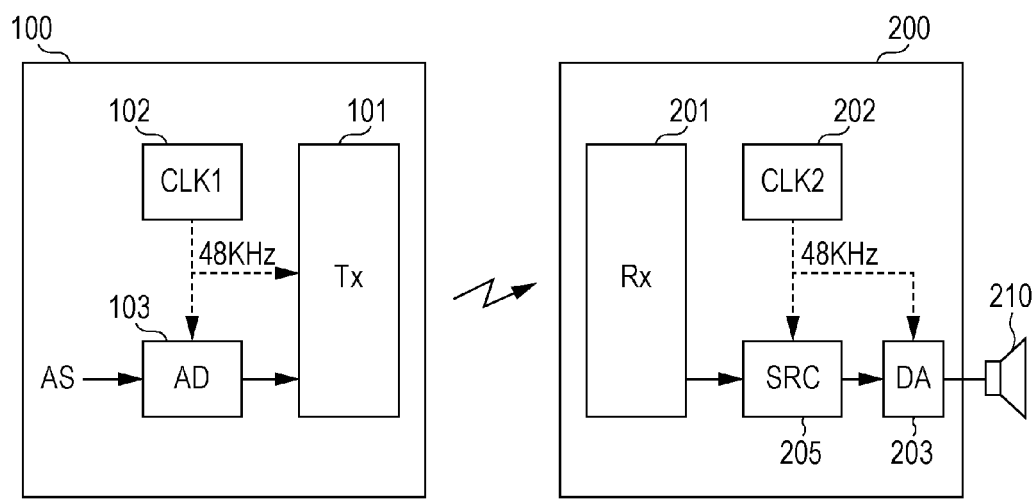

Next, FIG. 3B shows a model that performs a re-sampling process.

The transmitting device 100 side is the same as that illustrated in FIG. 2A, and for example, audio data that is sampled with the clock CLK1 of 48 KHz is transmitted.

In the receiving device 200, the receiving system 201 amplifies the received wireless signal, and demodulates the audio data. The demodulated audio data is re-sampled by a SRC (Sampling Rate Converter) 205. That is, for example, oversampling is performed with a frequency ((48×n) KHz) that is sufficiently higher than 48 KHz, and then the oversampled data is sampled with the clock CLK2 of 48 KHz that is generated from the clock generation unit 202.

The audio data re-sampled by the SRC 205 is converted into an analog audio signal by the D/A converter 203 along the clock CLK2, and is output from the speaker 210.

This method is effective in solving the asynchronous noise as illustrated in FIG. 2B.

However, in order to perform re-sampling of the audio data, it is pointed out that the change of sound quality (frequency characteristic) is observed according to the characteristic of the packaged SRC.

As described above, although processing models between the asynchronous transmitting device 100 and receiving device 200 have been exemplified, they have the following advantages and disadvantages.

In a receiving device 2 according to an embodiment of the present disclosure to be described in detail hereinafter, by selectively executing the asynchronous process and the re-sampling by the SRC, a very suitable receiving process according to situations can be implemented.

<3. Transmitting Device According to an Embodiment>

Figure 4:
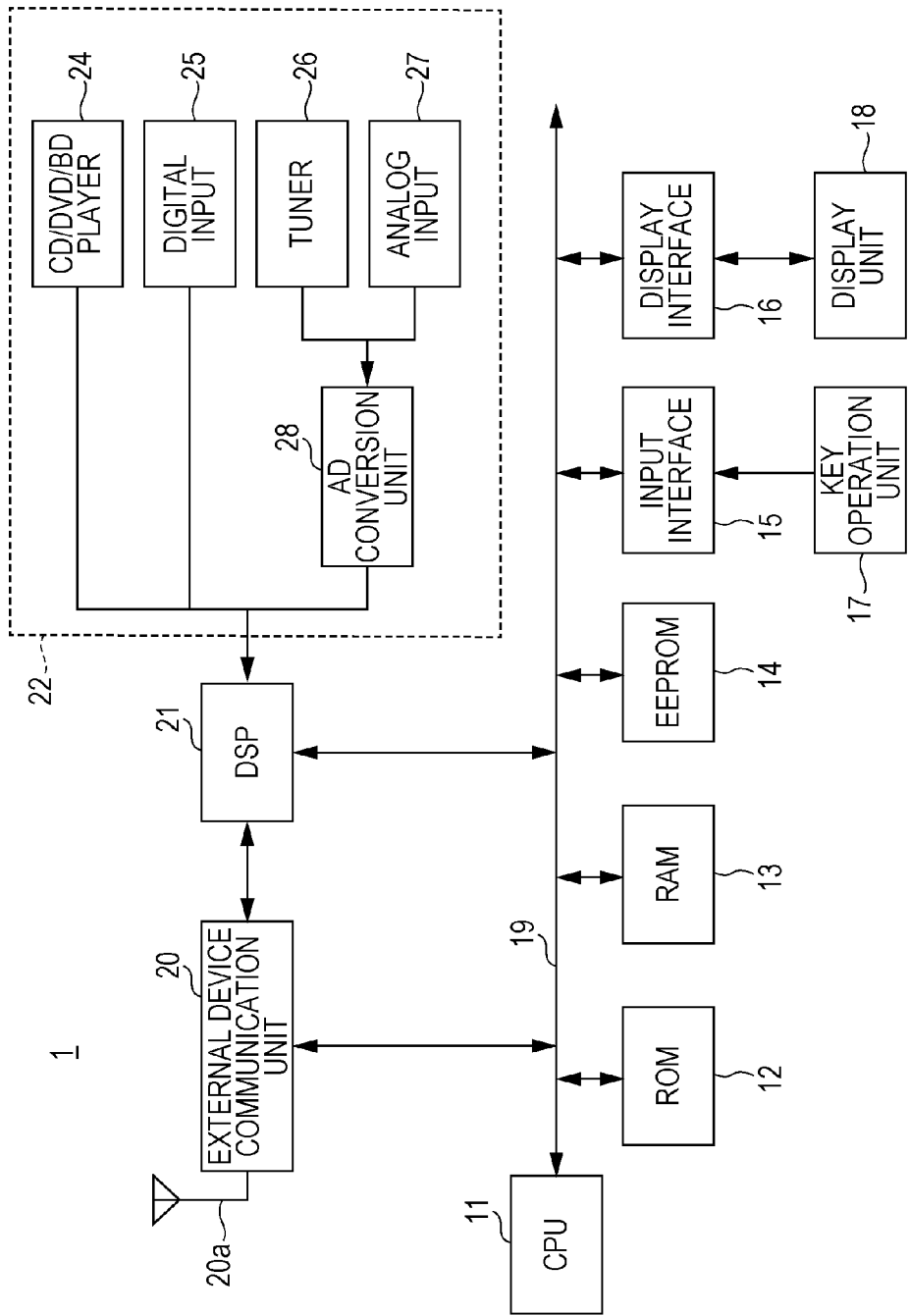
FIG. 4 is a block diagram of a transmitting device according to an embodiment.

For example, a configuration example of a transmitting device 1 according to an embodiment that can construct the communication system as illustrated in FIG. 1 is illustrated in FIG. 4.

The transmitting device 1 includes a CPU (Central Processing Unit) 11, a ROM (Read Only Memory) 12, a RAM (Random Access Memory) 13, and EEPROM (Electrically Erasable and Programmable Read Only Memory) 14. Further, the transmitting device 1 includes an input interface (I/F) 15, a display interface (I/F) 16, and an external device communication unit 20.

Further, a DSP (Digital Signal Processor) 21 is connected to the external device communication unit 20.

The CPU 11 functions as an arithmetic processing device and control device, and controls the entire operation or a part of the operation of the transmitting device 1 according to various kinds of programs recorded in the ROM 12, RAM 13, and EEPROM 14.

The ROM 12 and the EEPROM 14 store programs that are used by the CPU 11 or operation parameters.

The RAM 13 primarily stores programs used for execution of the CPU 11 or parameters that are properly changed during the execution.

They are connected to one another by a host bus constituted by an internal bus such as a CPU bus and a system bus 19 constituted by an external bus such as a PCI (Peripheral Component Interconnect/Interface) bus.

The input interface 15 is an interface that is composed of an input control circuit or the like, which generates and outputs an input signal to the CPU 11 based on information input by a user using a key operation unit 17. The user of the transmitting device 1 can input various kinds of data to the transmitting device 1 or instruct a processing operation through operation of the key operation unit 17.

The key operation unit 17 is an operation unit for inputting various kinds of data or instructing the processing operation with respect to the transmitting device 1. For example, the key operation unit 17 is an operation method in which a user operates a mouse, a keyboard, a touchpad, buttons, switches, and levers. Further, the key operation unit 17, for example, may be a remote control method (that is, remote controller) using infrared rays or other radio waves, or an external device, such as a mobile phone or a PDA, that corresponds to the operation of the content transmitting device 1.

The display interface 16 is an interface for transmitting a display output signal output from the CPU 11 to a display unit 18. The display unit 18, for example, is composed of a device that can visually report various kinds of information to the user, such as a CRT display device, a liquid crystal display device, an organic EL (Electroluminescence) display device, a plasma display device, and a display device such as a lamp.

The external device communication unit 20, for example, is a communication interface composed of a communication device for communicating with an extension unit such as a receiving device 2. The transmitting device 1 wirelessly transmits audio stream data or various kinds of control data with respect to the receiving device 2 through the external device communication unit 20 and an antenna 20a, and performs bi-directional data communication with the receiving device 2.

DSP 21 is a CPU that is specialized for various kinds of processing of the audio data or image data. The DSP 21 is connected to a content input unit 22 to which content that includes audio data used for transmission is input.

The content input unit 22 is a processing unit to which content which includes audio data that the transmitting device 1 uses for transmission is input.

The content input unit 22, for example, includes a CD/DVD/BD player unit 24, a digital input unit 25 to which a digital device such as an external player device is connected, a tuner 26, and an analog input unit 27 that is connected to an analog device such as a cassette tape or a record.

Further, the audio data input from the tuner 26 or the analog input unit 27 is converted from an analog signal into a digital signal by the AD conversion unit 28.

The audio data of the content input from the content input unit 22 is transmitted to the receiving device 2 (extension unit) through the DSP 21 and the external device communication unit 20.

Further, the transmitting device 1 related to this embodiment may be provided with, for example, a storage device, a drive, and a content output unit in addition to the above-described configuration.

The storage device is a device for storing data, which is configured as an example of a storage unit of the transmitting device 1 according to this embodiment. This storage device, for example, may be configured by a magnetic storage unit device such as a HDD (Hard Disk Drive), a semiconductor storage device, an optical storage device, or an opto-magnetic storage device.

This storage device can store programs executed by the CPU 11, various kinds of data, and audio data acquired from the outside.

The drive is a reader/writer for recording media, and is built in or is attached to an outside of the transmitting device 1. The drive reads information recorded on a magnetic disc, an optical disc, an opto-magnetic disc, which is mounted thereon, or a removable recording medium such as a semiconductor memory, and outputs the information to the RAM 13. Further, the drive can write a record on the magnetic disc, the optical disc, the opto-magnetic disc, which is mounted thereon, or the removable recording medium such as the semiconductor memory. The removable recording medium, for example, is a DVD or a BD. Further, the removable recording medium may be a Compact Flash (CF) (registered trademark), a memory stick, or an SD memory card (Secure Digital memory card). Further, the removable recording medium, for example, may be an IC card (Integrated Circuit card) mounting a non-contact type IC tip or an electronic device.

The content output unit is a processing unit that outputs content that includes audio data input from the content input unit 22 to an outside of the transmitting device 1. The content output unit, for example, may include a DA conversion unit converting audio data that is a digital signal into an analog signal, an amplifying unit amplifying the audio data converted into the analog signal, and a speaker outputting the amplified audio data.

Figure 5:
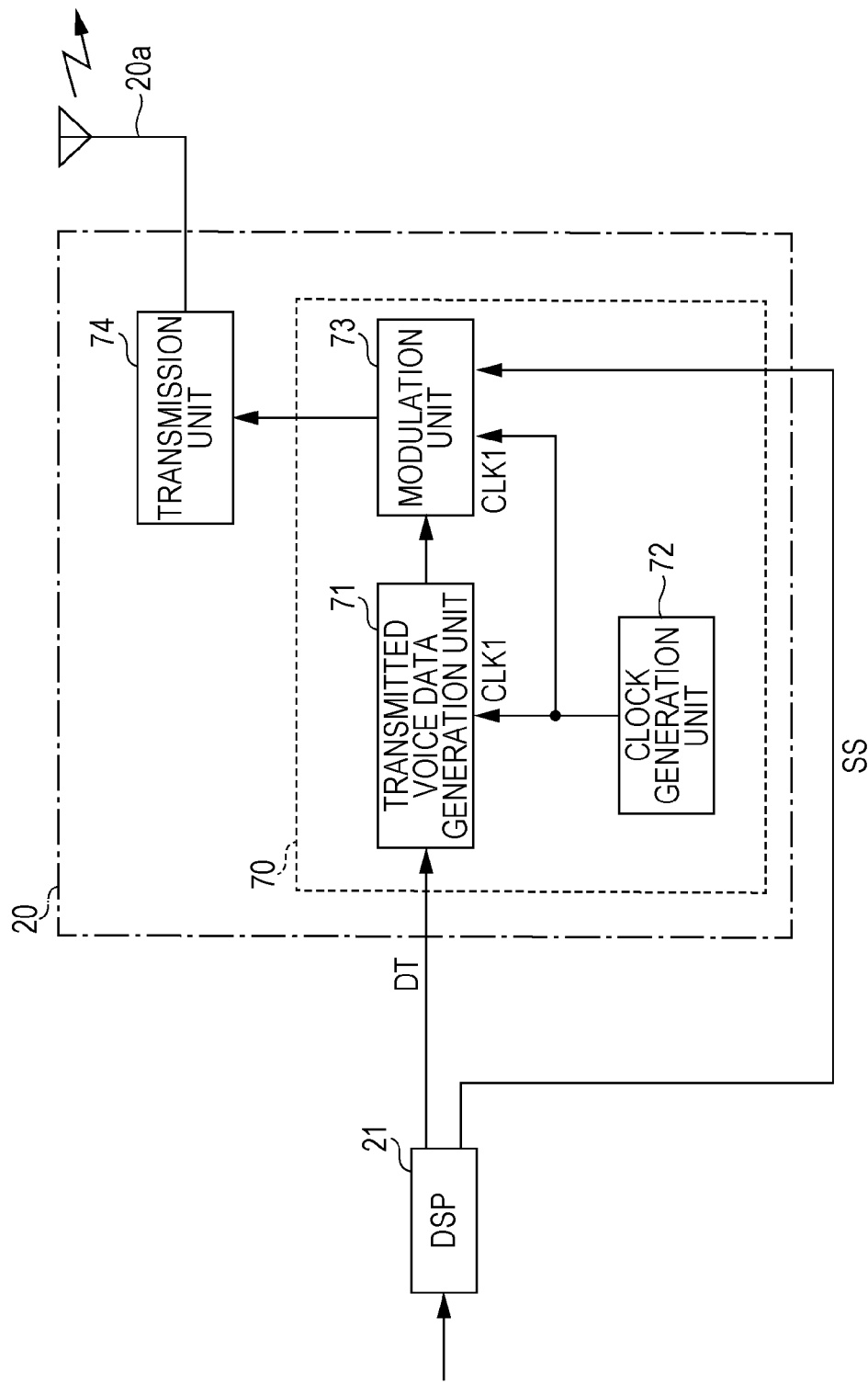
FIG. 5 is a block diagram of an external device communication unit of a transmitting device according to an embodiment.

FIG. 5 illustrates a configuration example of the transmitting system in the external device communication unit 20.

The external device communication unit 20 has a transmitted data processing unit 70 and a transmitting unit 74. The transmitted data processing unit 70 is provided with a transmitted audio data generation unit 71, a clock generation unit 72, and a modulation unit 73 as a hardware configuration or a software function.

The clock generation unit 72 generates a clock CLK1 having a predetermined sampling frequency using an oscillation circuit. For example, the frequency (that is, sampling frequency) of the clock CLK1 is 48 KHz. Of course, the clock may have another frequency of 44.1 KHz or 32 KHz. The oscillation circuit used in this clock generation unit 72 may be a crystal oscillator (X'tal Oscillator (XO)) or a voltage controlled crystal oscillator (Voltage Controlled X'tal Oscillator (VCXO)). Further, if the frequency of the clock CLK1 is a fixed value, it is preferable to use the crystal oscillator as the oscillation circuit.

Further, the clock generation unit 72 supplies the generated clock CLK1 to the transmitted audio data processing unit 71 and the modulation unit 73.

The transmitted audio data generation unit 71 generates audio data that is transmitted to the receiving device 2 as audio data that is sampled according to the clock CLK1 supplied from the clock generation unit 72. Further, if the audio data DT supplied from the DSP 21 is audio data that has already been sampled with the clock CLK1, it is not necessary for the transmitted audio data generation unit 71 to additionally perform sampling. If the audio data DT supplied from the DSP 21 is audio data sampled with another sampling frequency, the transmitted audio data generation unit 71 may generate audio data to be transmitted to the receiving device 2 through performing sampling rate conversion process.

The communication packet data is supplied to the modulation unit 73 as the transmitted audio data generated from the transmitted audio data generation unit 71.

The modulation unit 73, for example, performs encoding process according to a communication format with respect to the audio data depending on the clock CLK1 of 48 KHz. For example, a packet encoding or the like is performed. Further, the packet data encoded by the modulation unit 73 may include a clock component having a frequency to be used for the corresponding sound process in addition to the data of the sound itself.

Further, the modulation unit 73 outputs a transmission signal (signal encoded according to the communication format) that includes the modulated audio data to the transmitting unit 74.

In the case of mode switching control examples I and III to be described hereinafter, the transmitting device 1 transmits an instruction signal for mode switching to the receiving device 2. In this case, according to the mode switching control example I, the DSP 21 determines the type of the audio data. The modulation unit 73 receives a determination signal SS from the DSP 21, and inserts the instruction information according to this in the communication packet data.

Further, in the case of mode switching control example III, although not illustrated in FIG. 5, for example, the CPU 11 generates an AGC control instruction with respect to the receiving device 2. In this case, the modulation unit 73 receives the AGC instruction from the CPU 11, and inserts the instruction information according to this in the communication packet data.

The transmitting unit 74 frequency-converts and amplifies the encoded data input from the modulation unit 73 using an RF (Radio Frequency) circuit, and transmits the amplified data through the antenna 20a as a wireless signal. Here, the transmitted audio data is received in the receiving device 2 to be described hereinafter.

According to the configuration as described above, the transmitting device 1 can acquire content that includes the audio data from various audio data output sources, and transmit the audio data to the receiving device 2 through the external device communication unit 20. Further, through the above-described configuration, the transmitting device 1 can perform bi-directional data communication with the receiving device 2.

Up to now, an example of a hardware configuration that can realize the function of the transmitting device 1 has been described. The above-described constituent elements may be configured using a generic member or by hardware specialized to the function of each constituent elements. Accordingly, according to the technical level when practicing this embodiment, it is possible to properly change the used hardware configuration.

Further, the configuration of the transmitted data processing unit 70 as illustrated in FIG. 5 is exemplary, and for example, the configuration of the transmitted audio data generation unit 71 or the modulation unit 73 is not clearly separated as a different block, but the DSP 21 may perform part of the processing. That is, it is sufficient if the configuration can transmit the audio data sampled with the clock CLK1 in transmitting the audio data to the receiving device 2.

Further, it is sufficient if the transmitting device 1 according to this embodiment is a device that can transmit audio data to the receiving device 2 as a basic unit, and it is not necessary to take all the configuration of FIGS. 4 and 5.

<4. Receiving Device According to an Embodiment>

In continuation, referring to FIG. 6, the configuration of the receiving device 2 related to this embodiment will be described.

Figure 6:
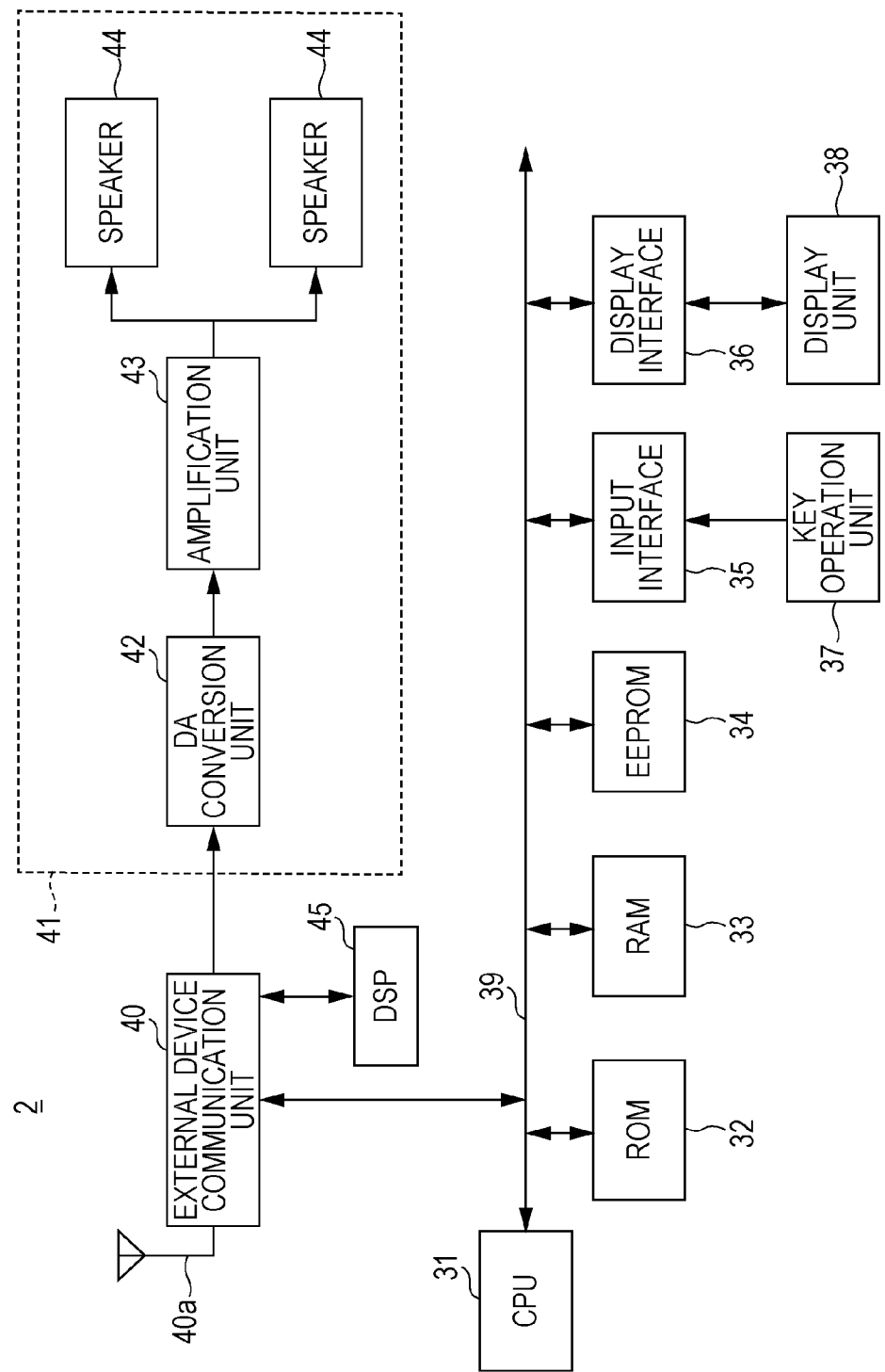
FIG. 6 is a block diagram of a receiving device according to an embodiment.

As illustrated in FIG. 6, the receiving device 2 includes a CPU 31, a ROM 32, a RAM 33, an EEPROM 34, an input interface (I/F) 35, a display interface (I/F) 36, an external device communication unit 40, and a DSP 45.

Further, an audio data output unit 41 for outputting the received audio data is connected to the external device communication unit 40.

The CPU 31 functions as an arithmetic processing device and control device, and controls the entire operation or a part of the operation of the receiving device 2 according to various kinds of programs recorded in the ROM 32, RAM 33, and EEPROM 34.

Further, the CPU 31 performs control process according to the instruction information transmitted from the transmitting device 1.

The ROM 32 and the EEPROM 34 store programs that are used by the CPU 31 or operation parameters.

The RAM 33 primarily stores programs used for execution of the CPU 31 or parameters that are properly changed during the execution.

They are connected to one another by a host bus constituted by an internal bus such as a CPU bus and a system bus 39 constituted by an external bus such as a PCI bus.

The input interface 35 is an interface that is composed of an input control circuit or the like, which generates and outputs an input signal to the CPU 31 based on information input by a user using a key operation unit 37. The user of the receiving device 2 can input various kinds of data to the receiving device 2 or instruct a processing operation through operation of the key operation unit 37.

The key operation unit 37 is an operation unit for inputting various kinds of data or instructing the processing operation with respect to the receiving device 2.

For example, the key operation unit 37 is an operation method in which a user operates a mouse, a keyboard, a touchpad, buttons, switches, and levers. Further, the key operation unit 37, for example, may be a remote control method (that is, remote controller) using infrared rays or other radio waves, or an external device, such as a mobile phone or a PDA, that corresponds to the operation of the receiving device 2.

The display interface 36 is an interface for transmitting a display output signal output from the CPU 31 to a display unit 38.

The display unit 38, for example, is composed of a device that can visually report various kinds of information to the user, such as a CRT display device, a liquid crystal display device, an organic EL display device, a plasma display device, and a display device such as a lamp.

The external device communication unit 40, for example, is a communication interface composed of a communication device for communicating with a basic unit such as the transmitting device 1 through an antenna 40*a*.

The receiving device 2 receives audio data or instruction information from the transmitting device 1 through the external device communication unit 40, and performs bi-directional data communication with the transmitting device 1.

Further, in the external device communication unit 40, configuration as a received audio data decoding function or buffering function is installed in addition to the communication function. Of course, the decode unit or the buffering unit may be installed on the outside of the external device communication unit 40.

The external device communication unit 40 selectively executes the asynchronous mode process as the audio data receiving process and the re-sampling mode process using the SRC.

The audio data output unit 41 is a processing unit that outputs the audio data transmitted from the transmitting device 1.

The audio data output unit 41, for example, includes a DA conversion unit 42, an amplifying unit 43, and a speaker 44.

The DA conversion unit 42 converts the received audio data that is a digital signal into an analog signal. The audio data converted into the analog signal is amplified by the amplifying unit 43, and then is output from the speaker 44.

In this example, the DSP 45 functions as a processing unit that determines the type of the received audio data. For example, the DSP 45 determines whether the received audio data is a sin wave of a single frequency or audio data such as normal music. The processing performed by the DSP 45 is necessary in the case of a mode switching control example II to be described hereinafter.

Further, the receiving device 2 may be provided with a DSP or a content input unit that is provided in the transmitting device 1.

Further, the receiving device 2 may be provided with, for example, a storage device or a drive, in addition to the above-described configuration.

The storage device is a device for storing data, which is configured as an example of a storage unit of the receiving device 2 according to this embodiment. This storage device, for example, may be configured by a magnetic storage unit device such as a HDD, a semiconductor storage device, an optical storage device, or an opto-magnetic storage device. This storage device can store programs executed by the CPU 31, various kinds of data, and audio data acquired from the outside.

The drive is a reader/writer for recording media, and is built in or is attached to an outside of the receiving device 2. The drive reads information recorded on a magnetic disc, an optical disc, an opto-magnetic disc, which is mounted thereon, or a removable recording medium such as a semiconductor memory, and outputs the information to the RAM 33. Further, the drive can write a record on the magnetic disc, the optical disc, the opto-magnetic disc, which is mounted thereon, or the removable recording medium such as the semiconductor memory. The removable recording medium, for example, is a DVD or a BD. Further, the removable recording medium may be a Compact Flash, a memory stick, or an SD memory card. Further, the removable recording medium, for example, may be an IC card mounting a non-contact type IC tip or an electronic device.

Figure 7:
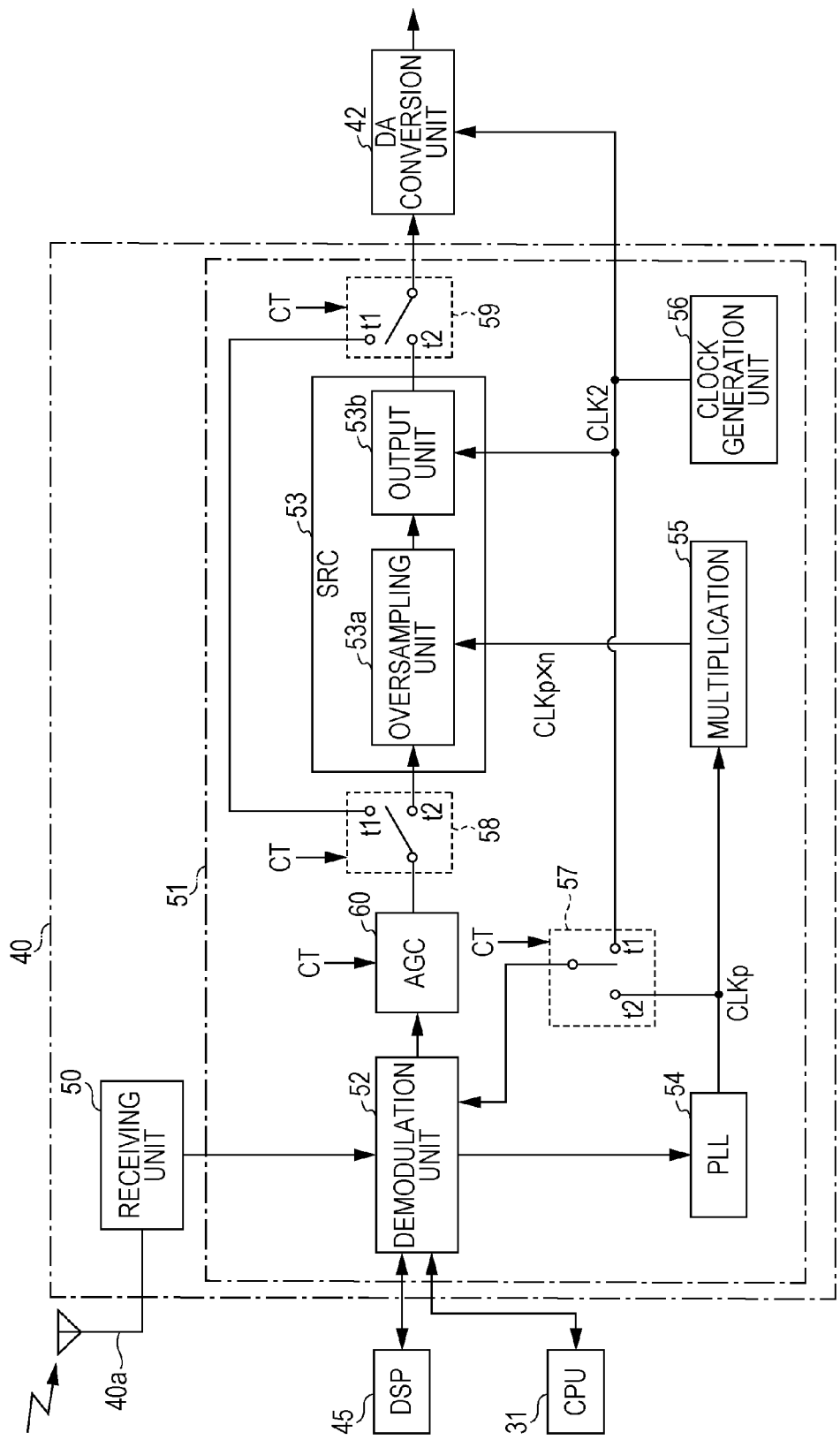
FIG. 7 is a block diagram of an external device communication unit of a receiving device according to an embodiment.

FIG. 7 illustrates a configuration example of the receiving system in the external device communication unit 40.

The external device communication unit 40 of the receiving device 2 has a receiving unit 50 and a received data processing unit 51. Further, the received data processing unit 51 is provided with a demodulation unit 52, an AGC (Automatic Gain Control) circuit 60, an SRC 53, a PLL circuit 54, a multiplication unit 55, a clock generation unit 56, and switches 57, 58, and 59 as a hardware configuration or a software function.

The receiving unit 50 receives a radio wave signal which includes audio data that is transmitted from the transmitting device 1 as a wireless signal, that is, audio data sampled according to the clock CLK1, through the antenna 40*a*. Further, the receiving unit 50 supplies the reception signal that is obtained by processing the received radio wave signal through an RF circuit to the demodulation unit 52.

The PLL circuit 54 extracts a clock component included in the reception signal that is input from the receiving unit 50 to the demodulation unit 52, and generates a clock CLKp that is synchronized with the reception signal. That is, the clock CLKp is a clock that is synchronized with the clock CLK1 generated by the clock generation unit 72 of the transmitting device 1. Further, the PLL circuit 54 supplies the generated clock CLKp to the multiplication unit 55 and the demodulation unit 52 through the switch 57.

On the other hand, the clock generation unit 56 generates a clock CLK2 having substantially the same frequency as the clock CLK1 generated by the clock generation unit 72 of the transmitting device 1. For example, in case where the frequency of the clock CLK1 is 48 KHz, the clock generation unit 56 also generates the clock CLK2 having the frequency of 48 KHz.

As the oscillation circuit used in the clock generation unit 56, a crystal oscillator (XO) or a voltage controlled crystal oscillator (VCXO) is suitable.

However, the clock CLK2 is asynchronous with the clock CLK1, and there may be a deviation between the clock CLK1 and the clock CLK2 depending on the degree of individual differences in the oscillator.

Further, the clock generation unit 56 supplies the generated clock CLK2 to the demodulation unit 52 through the SRC 53, the D/A converter 42, and the switch 57.

The switch 57 is a switch for selecting a clock that is used by the demodulation unit 52, and is switched by a control signal CT from the DSP 45 or the CPU 31.

In the case of the asynchronous mode process, the clock CLK2 is supplied to the demodulation unit 52 through a contact t1 of the switch 57.

In the case of the re-sampling mode process, the clock CLKp is supplied to the demodulation unit 52 through a contact t2 of the switch 57.

The demodulation unit 52 demodulates the reception signal input from the receiving unit 50 according to any one of the clock CLK2 and the clock CLKp selected through the switch 57. That is, the demodulation unit 52 performs baseband demodulation, binerization, and decoding of the packet data according to the communication focus, and demodulates the audio data. Further, if the instruction information is transmitted from the transmitting device 1, the demodulation unit 512 demodulates the instruction information.

Further, the demodulation unit 52 outputs the audio data to the AGC circuit 60 as a demodulated digital signal. If the communication information such as the instruction information is demodulated, the demodulation unit 52 outputs the instruction information to the CPU 31.

The ACG circuit 60 performs AGC process with respect to the demodulated audio data. The AGC process in the AGC circuit 60 is turned on/off by the control signal CT from the DSP 45 or the CPU 31.

The AGC circuit 60 outputs the audio data that is AGC-processed (or that is not AGC-processed).

The processing of the audio data output from the AGC circuit 60 is selected by the switches 58 and 59.

The switches 58 and 59 are switched by the control signal CT from the DSP 45 or the CPU 31.

In the case of the asynchronous mode process, the contact t1 of the switches 58 and 59 is selected, and the process of the SRC 53 is not performed. In the case of the re-sampling mode process, the contact t2 of the switches 58 and 59 is selected, and the process of the SRC 53 is performed.

Of course, the switches 58 and 59 are not physical switches, but correspond to selection process on a processing algorithm in the received data processing unit 51.

In the case of the asynchronous mode process, the audio data output from the AGC circuit 60 is supplied to the D/A converter 42 through the switches 58 and 59. Thereafter, as described above with reference to FIG. 6, the audio data is output from the speaker 44 as sound.

In the sound output in the asynchronous noise mode, the above-described asynchronous noise is generated. However, there is almost no change of sound quality (frequency characteristic), and it is suitable in terms of fidelity playback of the transmitted audio signals.

In the case of the re-sampling mode process, the audio data output from the AGC circuit 60 is supplied to the SRC 53 through the switch 58.

The SRC 53 has an oversampling unit 53*a* and an output unit 53*b*.

The oversampling unit 53*a* performs oversampling of the audio data that is demodulated by the demodulation unit 52 using a sampling frequency that is higher than the frequency of the clock CLKp.

More specifically, for example, the oversampling unit 53*a* obtains a clock having a sampling frequency that is n time (where, n is an integer that is larger than 1) higher than the frequency of the clock CLKp through multiplication of the clock CLKp that is supplied from the PLL circuit 54 using the multiplication unit 55. Further, the oversampling unit 53*a* performs oversampling of the audio data by the sampling frequency that is n times higher than the frequency of the clock CLKp. For example, if the frequency of the clock CLKp (≈the frequency of clock CLK1) is 48 KHz, the audio data may be oversampled using any one frequency of 12 to 48 KHz, which is obtained by multiplying the corresponding frequency in the range of n=256 to 1024.

As the frequency that is used in oversampling is higher, the possibility of obtaining better sound becomes higher, but the circuit scale that is necessary for the process becomes larger. Because of this, it is appropriate to determine the value of n in consideration of the balance between the sound quality and the circuit cost. The oversampling unit 53*a* sequentially writes the oversampled audio data, for example, in a buffer that is installed inside the output unit 53*b*.

The output unit 53*b* acquires the audio data that is oversampled by the oversampling unit 53*a* according to the clock CLK2 that is supplied from the clock generation unit 56, and outputs the acquired audio data to the D/A converter 42 through the switch 59. More specifically, the output unit 53*b*, for example, temporarily stores and maintains the audio data written by the oversampling unit 53*a* in an internal buffer, and sequentially reads the audio data according to the clock CLK2.

As described above, the SRC 53 converts the audio data that is demodulated with the clock CLKp that is synchronized with the reception signal into audio data that is based on the local clock CLK2, which is the same as 48 KHz, on the receiving device 2 side.

The re-sampled audio data is supplied to the D/A converter 42, and thereafter, as illustrated in FIG. 6, is output from the speaker 44 as sound.

In the audio output in the re-sampling mode, the asynchronous noise is solved. However, the sound quality (frequency characteristic) may be changed through the re-sampling in the SRC 53.

Through the above-described configuration, the receiving device 2 can receive the audio stream data from the transmitting device 1 through the external device communication unit 40, perform reproduction, and perform bi-directional data communication with the transmitting device 1.

Here, an example of a hardware configuration that can realize the function of the receiving device 2 has been described. The above-described constituent elements may be configured using a generic member or by hardware specialized to the function of each constituent elements. Accordingly, according to the technical level when practicing this embodiment, it is possible to properly change the used hardware configuration.

Further, the configuration of the received data processing unit 51 as illustrated in FIG. 7 is exemplary, and for example, the DSP 45 may perform the processing of the demodulation unit 52 or the SRC 53.

Further, it is sufficient if the receiving device 2 according to this embodiment has a configuration that can selectively execute the asynchronous mode process and the re-sampling mode process when receiving the audio data from the basic unit, and it is not necessary to take all the configuration of FIGS. 6 and 7.

For example, in the case of the sub-woofer amplifier 2*c* of FIG. 1, the display unit 38 and the display interface 36 are not necessary. Further, in the case of the surround rear amplifier 2*a* and the surround rear back amplifier 2*b*, a separate speaker is used, and thus the speaker 44 is unnecessary.

<5. Mode Switching Control Example I>

Hereinafter, the switching control example of the asynchronous mode process and the re-sampling mode process on the receiving device 2 side when the transmitting device 1 and the receiving device 2 having the above-described configuration perform audio data communication with each other will be described. Further, the processing examples of FIGS. 8 to 11 show only the mode switching control process that is executed by the transmitting device 1 and the receiving device 2 when the communication of the audio data starts or when the communication of the audio data is executed, and the order of audio data communication is omitted.

As the mode switching control example I, an example in which the transmitting device 1 side instructs mode switching to the receiving device 2 will be described.

Figure 8:
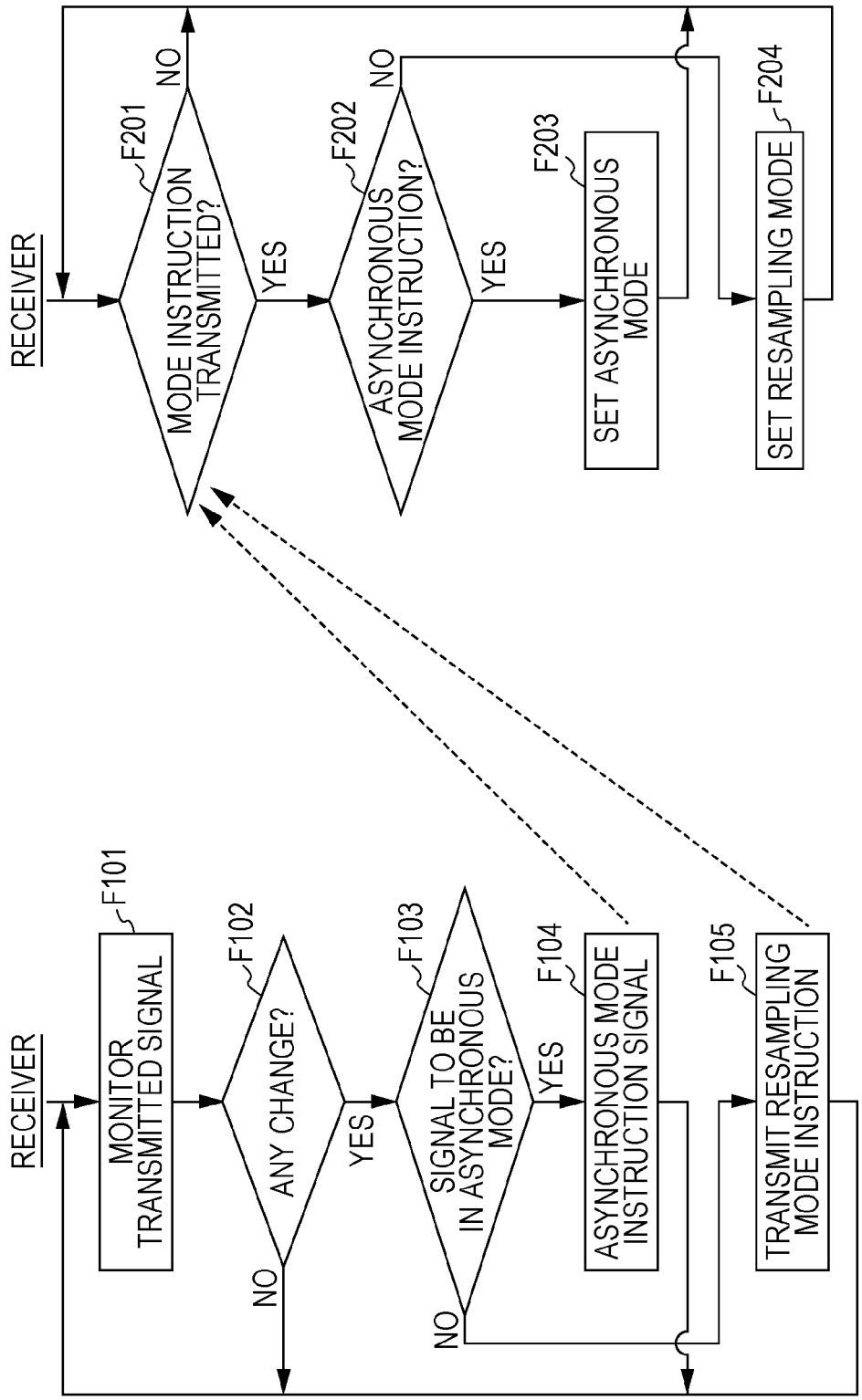
FIG. 8 is a flowchart of a mode switching control example I according to an embodiment.

FIG. 8 shows a processing example of the DSP 21 of the transmitting device 1 and the CPU 31 of the receiving device 2.

In the transmitting device 1, the DSP 21 monitors the type of the transmitted audio data in step F101.

Specifically, the type monitoring process may be a frequency analyzing process (for example, FFT process).

Further, it is determined whether the type of the audio data is changed. For example, in the case of starting the audio data transmission to the receiving device 2 from now on, it is determined that there is a change in step F102 in order to newly perform a certain kind of audio data transmission. Further, even if there occurs a switching between the type of audio data to be processed by the asynchronous mode process and the type of audio data to be processed by the re-sampling mode process during audio data transmission, it is determined that there is a change in step F102.

If it is determined that audio data of which the type corresponds to the asynchronous mode process is transmitted in steps F101 and F102, the DSP 21 proceeds from step F103 to step F104, and a determination signal SS for determining that the type of the audio data corresponds to the asynchronous mode is supplied to the external device communication unit 20. In this case, as illustrated in FIG. 5, the modulation unit 73 inserts instruction information for instructing the asynchronous mode process into the communication packet data, and as a result, the instruction information for the asynchronous mode process is transmitted to the receiving device 2.

Further, if it is determined that audio data of which the type corresponds to the re-sampling mode process is transmitted in steps F101 and F102, the DSP 21 proceeds from step F103 to step F105, and a determination signal SS for determining that the type of the audio data corresponds to the re-sampling mode is supplied to the external device communication unit 20. In this case, the modulation unit 73 inserts instruction information for instructing the re-sampling mode process into the communication packet data, and as a result, the instruction information for the re-sampling mode process is transmitted to the receiving device 2.

In the receiving device 2 side, the CPU 31 monitors the reception of mode instruction information in step F201.

If the mode instruction information is received, the CPU 31 confirms the contents of the instruction information in step F202.

If the mode instruction information is the instruction information for the asynchronous mode process, the CPU 31 performs the asynchronous mode setting in step F203. That is, the CPU 31 connects the contacts t1 of the switches 57, 58, and 59 in the external device communication unit 40 as shown in FIG. 7 through the control signal CT. Through this, the demodulation unit 52 performs demodulation based on the clock CLK2, and thus the asynchronous mode process is executed in which the demodulated audio data is supplied after the D/A converter 42.

Further, if the received instruction information is the instruction information for the re-sampling mode process, the CPU 31 performs the re-sampling mode setting in step F204. That is, the CPU 31 connects the contacts t2 of the switches 57, 58, and 59 in the external device communication unit 40 through the control signal CT. Through this, the demodulation unit 52 performs synchronous demodulation based on the clock CLKp, the audio data demodulated thereby is re-sampled by the SRC 53, and thus the re-sampling mode process is executed in which the audio data by the clock CLK2 is supplied after the D/A converter 42.

As described above, the switching control between the asynchronous mod process and the re-sampling mode process in the receiving device 2 is executed according to the audio data determination on the transmitting device 1 side.

That is, on the transmitting device 1 side, the DSP 21 is provided as a determination unit for determining the type of the audio data that is transmitted as the transmission signal. Further, the transmitted data processing unit 70 includes instruction information for instructing any one of the asynchronous mode process and the re-sampling mode process in the transmission signal according to the result of the determination in the DSP 21.

On the receiving device 2 side, the CPU 31 as the control unit controls the received data processing unit 51 to execute any one of the asynchronous mode process and the re-sampling mode process according to the reception of the instruction information from the transmitting device 1.

Here, whether the transmitting device 1 instructs the asynchronous mode process or the re-sampling mode process depending on the type of the audio data will be described as a specific example as follows.

For example, if the DSP 21 determines the type of the transmitted audio data as single frequency data, for example, as sin wave data, the DSP 21 instructs the re-sampling mode process. On the other hand, if the DSP 21 determines the type of the transmitted audio data as normal audio data (complex frequency data such as music and sound), the DSP 21 instructs the asynchronous mode process.

Through doing so, in the case of outputting a single-tone sound as a sin wave through a speaker, the asynchronous noise is conspicuously audible. However, by performing the re-sampling mode process, single-tone sound without asynchronous noise can be output through the speaker. On the other hand, in the case of music or the like, the asynchronous noise is not so sensitive, and by performing the asynchronous mode in which the frequency characteristic change is smaller than that in the re-sampling mode, music reproduction that is faithful to the original sound quality can be provided to the user.

Further, the following example may be considered.

If the DSP 21 determines the type of the transmitted audio data as normal audio data (music or the like), the DSP 21 instructs the re-sampling mode process. On the other hand, if the DSP 21 determines the type of the transmitted audio data as audio data for measuring the frequency characteristic (for example, a sweep signal of which the frequency is gradually changed), the DSP 21 instructs the asynchronous mode process.

In the case of the normal audio data such as music, the asynchronous noise, which is not noticeable, is generated, and thus it may be considered to select the re-sampling mode process.

On the other hand, if the re-sampling mode process is performed, frequency characteristic variation may occur. This is not preferable in the case where the measured audio data is transmitted and frequency characteristic measurement is performed with respect to the output sound of the speaker 44 (or output signal on a speaker connection terminal of an amplifier device that becomes the receiving device 2) using a measuring machine. Accordingly, in the case of transmitting audio data such as a sweep signal for the frequency characteristic measurement, an appropriate measurement can be performed in the asynchronous mode.

In addition, it may be diversely considered which mode is to be selected with respect to certain audio data. Although various kinds of measurement audio data, such as a white noise signal, a pink noise signal, an electronic sound signal, may exist except for the normal audio data, the DSP 21 performs the frequency analyzing process and determines which mode is proper.

Further, a user may select the asynchronous mode or the re-sampling mode through the key operation unit 17 of the transmitting device 1. In this case, the CPU 11 of the transmitting device 1 transmits the instruction for the asynchronous mode or the re-sampling mode to the external device communication unit 20 according to the user's operation.

Further, as described in the above-described example, in the case of outputting normal audio data such as music, sound, and the like, users may have some differences in thinking in determining whether to perform the asynchronous mode process or the re-sampling mode process.

Accordingly, in the case of the normal audio data, a user may select the asynchronous mode process or the re-sampling mode process. For example, if the user selects the asynchronous mode for processing the normal audio data, the DSP 21 instructs the asynchronous mode with respect to the normal audio data or the sweep signal, and instructs the re-sampling mode with respect to the single frequency signal. On the contrary, if the user selects the re-sampling mode for processing the normal audio data, the DSP 21 instructs the asynchronous mode with respect to the sweep signal, and instructs the re-sampling mode with respect to the single frequency signal or the normal audio data.

<6. Mode Switching Control Example II>

As the mode switching control example II, an example in which the receiving device 2 determines the type of the received audio data and performs mode switching will be described.

Figure 9:
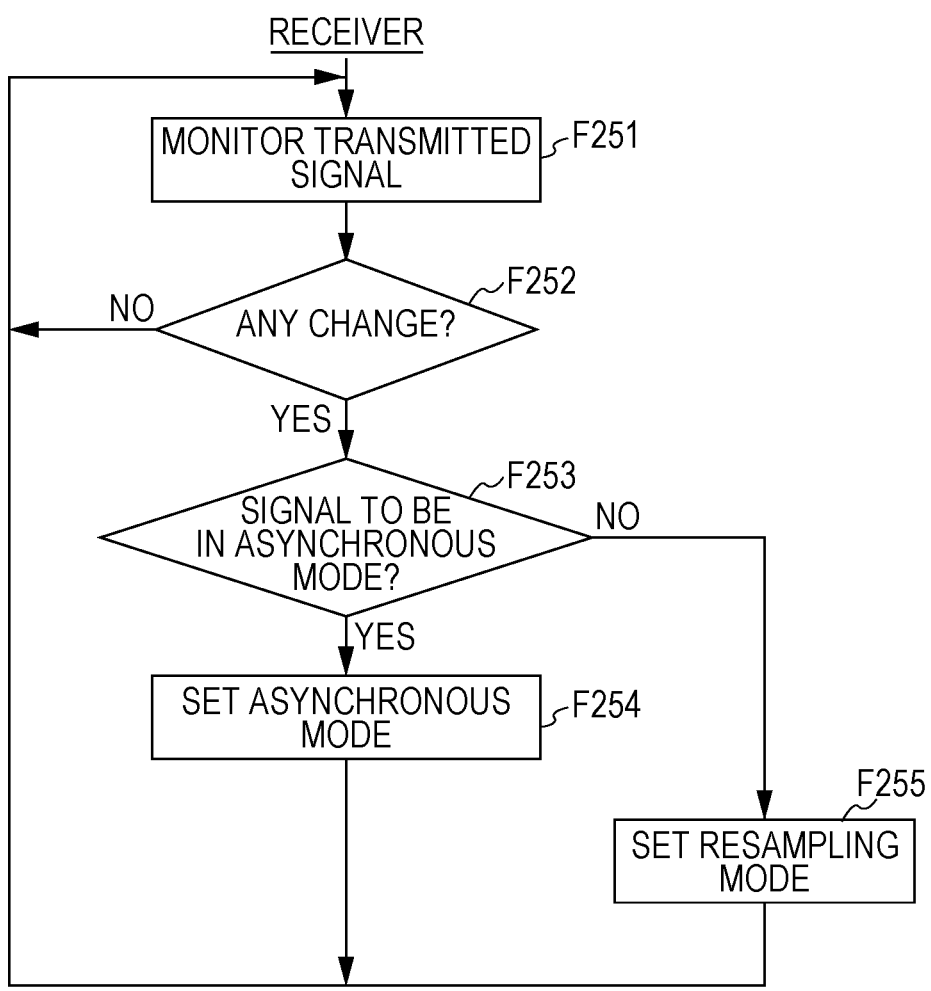
FIG. 9 is a flowchart of a mode switching control example II according to an embodiment.

FIG. 9 shows a processing example of the DSP 45 of the receiving device 2.

The DSP 45 of the receiving device 2 monitors the type of audio data received through the external device communication unit 40 in step F251. Specifically, the type monitoring process may be a frequency analyzing process (for example, FFT process).

Further, it is determined whether the type of the audio data is changed. For example, in the case of initially receiving the audio data at the start of communication, it is determined that there is a change in step F252 in order to newly receive a certain kind of audio data. Further, even if there occurs a switching between the type of audio data to be processed by the asynchronous mode process and the type of audio data to be processed by the re-sampling mode process during audio data reception, it is determined that there is a change in step F252.

If the DSP 45 determines that audio data of which the type corresponds to the asynchronous mode process is received in steps F251 and F252, the DSP 21 proceeds to step F254, and performs the asynchronous mode setting of the external device communication unit 40. That is, the DSP 45 connects the contacts t1 of the switches 57, 58, and 59 in the external device communication unit 40 through the control signal CT. Through this, the demodulation unit 52 performs demodulation based on the clock CLK2, thus the asynchronous mode process is executed in which the demodulated audio data is supplied after the D/A converter 42.

Further, if the DSP 21 determines that audio data of which the type corresponds to the re-sampling mode process is received in steps F251 and F252, the DSP 21 proceeds to step F255, and performs the re-sampling mode setting of the external device communication unit 40. That is, the DSP 45 connects the contacts t2 of the switches 57, 58, and 59 in the external device communication unit 40 through the control signal CT. Through this, the demodulation unit 52 performs synchronous demodulation based on the clock CLKp, and thus the demodulated audio data is re-sampled by the SRC 53, and thus the re-sampling mode process is executed in which the demodulated audio data by the clock CLK2 is supplied after the D/A converter 42.

As described above, the switching control between the asynchronous mod process and the re-sampling mode process in the receiving device 2 is executed according to the determination of the received audio data.

That is, in the receiving device 2, the control unit (DSP 45) determines the type of the audio data that is obtained from the transmission signal received through the receiving unit 50, and controls the received data processing unit 51 to execute any one of the asynchronous mode process and the re-sampling mode process according to the result of the determination.

Here, whether the DSP 45 instructs the asynchronous mode process or the re-sampling mode process depending on the type of the audio data is considered as a specific example described in the mode switching control example I.

For example, if the DSP 45 determines the type of the transmitted audio data as single frequency data, for example, as sin wave data, the DSP 45 instructs the re-sampling mode process. On the other hand, if the DSP 45 determines the type of the transmitted audio data as normal audio data (complex frequency data such as music and sound), the DSP 45 instructs the asynchronous mode process.

Through doing so, in the case of outputting a single-tone sound as a sin wave through a speaker, the asynchronous noise is conspicuously audible. However, by performing the re-sampling mode process, single-tone sound without asynchronous noise can be output through the speaker. On the other hand, in the case of music or the like, the asynchronous noise is not so sensitive, and by performing the asynchronous mode in which the frequency characteristic change is smaller than that in the re-sampling mode, music reproduction that is faithful to the original sound quality can be provided to the user.

Further, the following example may be considered.

If the DSP 45 determines the type of the transmitted audio data as normal audio data (music or the like), the DSP 45 instructs the re-sampling mode process. On the other hand, if the DSP 45 determines the type of the transmitted audio data as audio data for measuring the frequency characteristic (for example, a sweep signal), the DSP 45 instructs the asynchronous mode process.

In the case of the normal audio data such as music, the asynchronous noise, which is not noticeable, is generated, and thus the re-sampling mode process is selected.

On the other hand, in the case of transmitting audio data such as a sweep signal for the frequency characteristic measurement, an appropriate measurement can be performed in the asynchronous mode.

In addition, it may be diversely considered which mode is to be selected with respect to certain audio data in the same manner as the mode switching control example I.

Further, a user may select the asynchronous mode or the re-sampling mode through the key operation unit 37.

In the case of outputting normal audio data such as music, sound, and the like, a user may designate whether to perform the asynchronous mode process or the re-sampling mode process. For example, if the user selects the asynchronous mode for processing the normal audio data, the DSP 45 performs the asynchronous mode control with respect to the normal audio data or the sweep signal, and performs the re-sampling mode control with respect to the single frequency signal. On the contrary, if the user selects the re-sampling mode for processing the normal audio data, the DSP 45 performs the asynchronous mode control with respect to the sweep signal, and performs the re-sampling mode control with respect to the single frequency signal or the normal audio data.

<7. Mode Switching Control Example III>

As the mode switching control example III, an example in which the transmitting device 1 side instructs AGC process to the receiving device 2 and in conjunction with this, the receiving device 2 switches the asynchronous mode process and the re-sampling mode process will be described.

Figure 10:
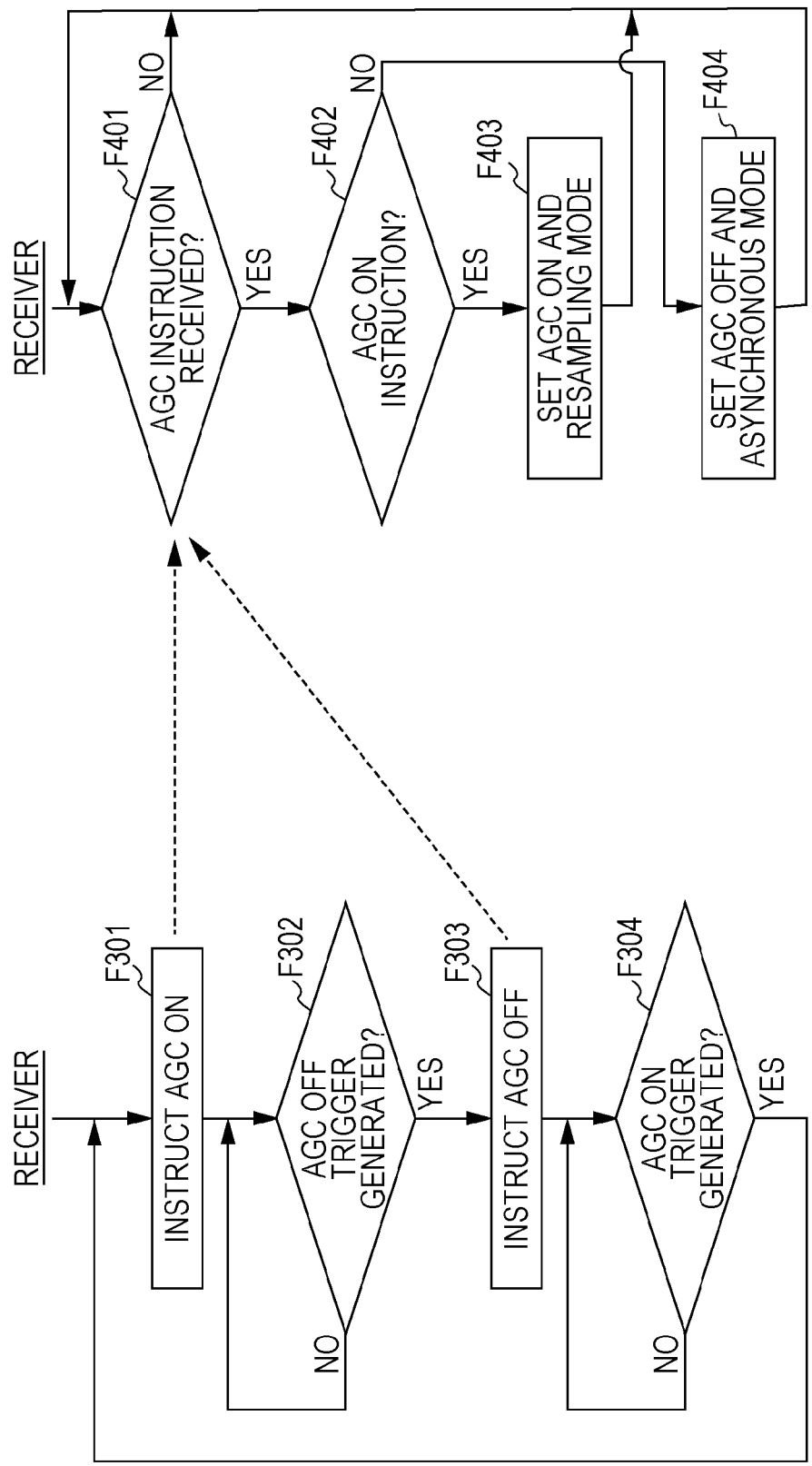
FIG. 10 is a flowchart of a mode switching control example III according to an embodiment.

FIG. 10 shows a processing example of the CPU 11 of the transmitting device 1 and the CPU 31 of the receiving device 2.

As an example, it is assumed that the receiving device 2 side executes the AGC process at an initial state. Because of this, at the start of communication, the transmitting device 1 first instructs the AGC-on in step F301. Specifically, if the CPU 11, for example, intends to start the audio data transmission with respect to the receiving device 2 from now on, the CPU 11 instructs transmission of AGC-on instruction to the external device communication unit 20 in step F301. In this case, the modulation unit 73 of the external device communication unit 20 inserts AGC-on instruction information into the communication packet data, and as a result, AGC-on instruction information is transmitted to the receiving device 2.

Further, if an AGC-off trigger is generated, the CPU 11 proceeds from step F302 to step F303, and performs the AGC-off instruction. Specifically, the CPU 11 instructs transmission of the AGC-off instruction to the external device communication unit 20 in step F303. In this case, the modulation unit 73 of the external device communication unit 20 inserts the AGC-off instruction information into the communication packet data, and as a result, the AGC-off instruction information is transmitted to the receiving device 2.

The AGC-off trigger, for example, may be a user's operation of AGC-off, or start of transmission of a specified type of audio data. A specific example will be described hereinafter.

Further, when the AGC-on trigger is generated, the CPU 11 proceeds from step F304 to step F301, and instructs transmission of the AGC-on instruction to the external device communication unit 20. Even in this case, the AGC-on instruction information is transmitted to the receiving device 2.

The AGC-on trigger, for example, may be a user's operation of AGC-on, or start of transmission of a specified type of audio data.

In the receiving device 2 side, the CPU 31 monitors the reception of AGC-on/off instruction information in step F401.

If the AGC-on information is received, the CPU 31 confirms the contents of the instruction information in step F402.

If the mode instruction information is the AGC-on instruction information, the CPU 31 performs the AGC-on setting and the re-sampling mode process setting in step F403. That is, the CPU 31 connects the contacts t2 of the switches 57, 58, and 59 in the external device communication unit 40 through the control signal CT. Further, the CPU 31 performs the AGC-on control with respect to the AGC circuit 60.

Through this, the demodulation unit 52 performs synchronous demodulation based on the clock CLKp, and thus the re-sampling mode process is executed in which the demodulated audio data is AGC-processed, re-sampling is additionally performed by the SRC 53, and the audio data by the clock CLK2 is supplied after the D/A converter 42.

Further, if the received instruction information is the AGC-off instruction, the CPU 31 performs the AGC-off setting and the asynchronous mode setting in step F404. That is, the CPU 31 connects the contacts t1 of the switches 57, 58, and 59 in the external device communication unit 40 through the control signal CT. Further, the AGC-off control is performed with respect to the AGC circuit 60.

Through this, the demodulation unit 52 performs demodulation based on the clock CLK2, and thus the asynchronous mode process is executed in which the demodulated audio data is not AGC-processed, but is supplied as it is after the D/A converter 42.

As described above, the switching control between the asynchronous mod process and the re-sampling mode process in the receiving device 2 is executed in conduction with the AGC process instruction from the transmitting device 1 (AGC-on/off in the receiving device 2).

That is, on the transmitting device 1 side, the transmitted data processing unit 70 includes instruction information for instructing AGC-on/off on the receiving device 2 side into the transmission signal as the instruction information that is the mode switching instruction.

On the receiving device 2 side, the CPU 31 as the control unit selects the asynchronous mode process or the re-sampling mode process according to the reception of the instruction information from the transmitting device. That is, if the AGC-on is instructed with respect to the audio data obtained from the transmission signal, the CPU 31 makes the received data processing unit 51 execute the AGC process and the re-sampling mode process, while if the AGC-off is instructed, the CPU 31 makes the received data processing unit 51 turn off the AGC process for executing the asynchronous mode process.

Here, the following example may be considered as determination of AGC-on trigger and AGC-off trigger through the transmitting device 1.

Typically, in the case of performing various kinds of measurements with respect to the output sound, the AGC process is turned off. Accordingly, in the case of transmitting the audio data for the purpose of various kinds of measurements such as frequency characteristic measurement and Dolby measurement, the transmitting device (CPU 11) determines that the AGC-off trigger is generated, and controls the transmission of the AGC-off instruction signal in step F303.

In the case of starting the transmission of the normal audio data such as music or the like after the measurement, the transmitting device 1 determines that the AGC-on trigger is generated, and controls the transmission of the AGC-on instruction signal in step F301.

Through doing so, in the case of reproducing normal music, the AGC process is performed and the re-sampling mode process is performed, so that music or the like can be provided to a user without asynchronous noise.

Further, during the measurement, the AGC-off is considered, and the original characteristic measurement is executed. Further, since the asynchronous mode is considered, and the measurements can be executed without sound quality change through the re-sampling mode process.

Further, the user's AGC operation may be called AGC-on or AGC-off trigger.

The AGC process is to prevent the occurrence of reproduction audio output of an excessive level, and has a protection function of the speaker on the receiving device 2 side. On the other hand, the reproduced sound may not be faithful to the original volume level.

Because of this, a user may select AGC-on during a normal use, and may select AGC-off in the case where reproduction sound quality that is faithful to the original sound is necessary.

In this example, AGC-on corresponds to the re-sampling mode, and this is because sound quality change does not occur as described above.

Accordingly, during a normal use, since the AGC-on is selected, the AGC process can be beneficially performed as the re-sampling mode, and the asynchronous noise does not occur in the re-sampling mode. On the other hand, when the user instructs AGC-off to obtain faithful sound reproduction, the GC-off is performed in the asynchronous mode to prevent the sound quality change due to the re-sampling, and the sound output that is faithful to the original sound is executed.

Further, in the processing example of FIG. 10, the transmitting device 1 transmits the AGC process instruction information, and the receiving device 2 processes this as an instruction for both sides of the AGC process and the reception processing mode selection (selection of asynchronous mode/re-sampling mode). In addition, when the transmitting device 1 transmits the AGC process instruction information, the transmitting device 1 may further transmit the instruction information for selecting the reception processing mode when transmitting the AGC processing instruction information.

Further, in accordance with a user's operation in addition to the AGC process, the switching control in conjunction with the asynchronous mode/re-sampling mode may be considered.

For example, in the case where an equalization adjustment unit (sound quality adjustment unit) or a reverb processing unit is installed in the receiving device 2, it is considered that a user can select various kinds of equalizing setting and reverb setting on the transmitting device 1 side. In this case, although the transmitting device 1 instructs the equalizing mode or reverb mode to the receiving device 2, it may be considered that the receiving device 2 may make the equalizing mode and the revert mode correspond to the asynchronous mode/re-sampling mode, and switch the asynchronous mode/re-sampling mode in conjunction with the instructed mode.

Further, in the above example, it is exemplified that the AGC-on is instructed in an initial state. However, the AGC-off may be instructed in an initial state. Further, in the initial state, the AGC instruction may not be performed, and the AGC on/off may be performed by the user operation on the receiving device 2 side.

<8. Mode Switching Control Example IV>

As the mode switching control example IV, an example in which when the receiving device 2 performs the AGC on/off control, it newly changes the asynchronous mode process and the re-sampling mode process in conjunction with the AGC on/off control will be described.

Figure 11:
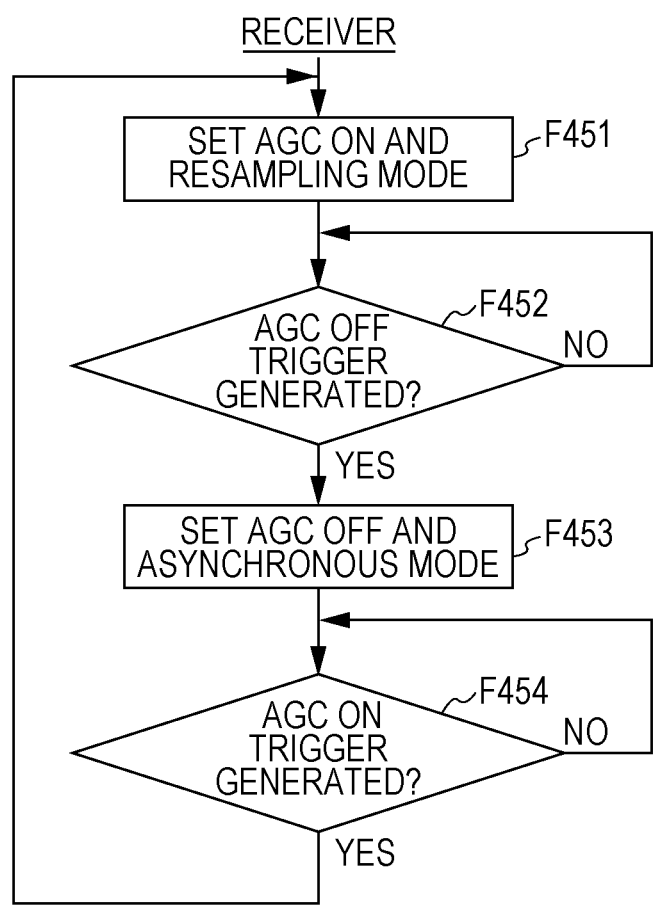
FIG. 11 is a flowchart of a mode switching control example IV according to an embodiment.

FIG. 11 shows a processing example of the CPU 31 of the receiving device 2.

As an example, it is assumed that the receiving device 2 performs the AGC process at an initial state. Because of this, the CPU 31 first performs the AGC-on and re-sampling mode control in step F451. Specifically, if the audio data reception is started or the power is turned on, the CPU 31, for example, instructs the AGC-on to the AGC circuit 60 of the external device communication unit 40 through the control signal CT in step F451. Further, the CPU 31 performs re-sampling mode setting of the external device communication unit 40. That is, the CPU 31 connects the contacts t2 of the switches 57, 58, and 59 in the external device communication unit 40 through the control signal CT.

Through this, the demodulation unit 52 performs synchronous demodulation based on the clock CLKp, and thus the re-sampling mode process is executed in which the demodulated audio data is AGC-processed, re-sampling is additionally performed by the SRC 53, and the audio data by the clock CLK2 is supplied after the D/A converter 42.

Further, if an AGC-off trigger is generated, the CPU 31 proceeds from step F452 to step F453, and performs instruction of the AGC-off and the asynchronous mode. The AGC-off trigger, for example, may be a user's operation of AGC-off or a start of reception of audio data of a special type.

Specifically, the CPU 31 instructs the AGC-off to the AGC circuit 60 of the external device communication unit 40 in step F453. Further, the CPU 31 connects the contacts t2 of the switches 57, 58, and 59 in the external device communication unit 40 through the control signal CT, and performs the re-sampling mode setting.

Through this, the demodulation unit 52 performs demodulation based on the clock CLK2, and thus the asynchronous mode process is executed in which the demodulated audio data is not AGC-processed, but is supplied as it is after the D/A converter 42.

Further, if an AGC-on trigger is generated, the CPU 31 proceeds from step F454 to step F451, and performs AGC-on instruction and re-sampling mode instruction to the external device communication unit 40. The AGC-on trigger, for example, may be a user's operation of AGC-on or a start of reception of audio data of a special type.

As described above, the switching control between the asynchronous mode process and the re-sampling mode process in the receiving device 2 is executed in conjunction with the AGC control.

The CPU 31 as the control unit controls the received data processing unit 51 to execute the re-sampling mode process when the AGC process for the received audio data is turned on, and controls the received data processing unit 51 to execute the asynchronous mode process when the AGC process is turned off.

Here, the following example may be considered as determination of AGC-on trigger and AGC-off trigger through the CPU 31.

Typically, in the case of performing various kinds of measurements with respect to the output sound, the AGC process is turned off. Accordingly, in the case of receiving the audio data for the purpose of various kinds of measurements such as frequency characteristic measurement and Dolby measurement, the DSP 45 (or CPU 31) determines that the AGC-off trigger is generated. In this case, the DSP 45 controls the AGC-off and the asynchronous mode in step F453.

When the normal audio data such as music is received after measurements, it is determined that the AGC-on trigger is generated, and thereby the control of AGC-on and the re-sampling mode.

In this way, when the normal music is reproduced, it is possible to perform the AGC process, and to provide music or the like to the user in a state where there is no asynchronous noise by the re-sampling process.

At the time of measurement, the AGC process is off, the original characteristic measurement is performed, and the asynchronous mode is considered. Accordingly, it is possible to perform the measurement or the like in a state where there is no sound quality change due to the re-sampling mode process.

In addition, the AGC operation of the user may be a trigger of the AGC-on or the AGC-off.

As described above, the user selects the AGC-on during a normal use, and selects the AGC-off when the reproducing quality close to the original sound.

Accordingly, during a normal use, since the AGC-on is selected, the AGC process can be beneficially performed as the re-sampling mode, and the asynchronous noise does not occur in the re-sampling mode. On the other hand, in order for a user to obtain faithful sound reproduction, the AGC-off is performed in the asynchronous mode to prevent the sound quality change due to the re-sampling, and the sound output that is faithful to the original sound is executed.

Further, in accordance with a user's operation in addition to the AGC process, the switching control in conjunction with the asynchronous mode/re-sampling mode may be considered.

For example, in the case where an equalization adjustment unit (sound quality adjustment unit) or a reverb processing unit is installed in the receiving device 2, it is considered that a user can select various kinds of equalizing setting and reverb setting through the key operation unit 37. In this case, although the CPU 31 instructs the equalizing mode or reverb mode to an equalizing adjustment unit or a reverb processing unit, the equalizing mode and the revert mode are made to correspond to the asynchronous mode/re-sampling mode. Further, it may be considered to newly change the asynchronous mode/re-sampling mode in conjunction with the instructed mode.

Further, in the above example, it is exemplified that the AGC-on is instructed in an initial state. However, the AGC-off may be instructed in an initial state. Further, the initial state may be in accordance with the user's operation.

As described above, the configuration of the transmitting device 1 and the receiving device 2 and the processing examples of mode switching control examples I to IV have been described. According to this technology, it is possible to execute an appropriate receiving process with respect to the audio data on the receiving device 2 side through switching between the asynchronous mode process and the re-sampling mode process. For example, the re-sampling mode process is performed in the situation where asynchronous noise becomes significant, and the asynchronous mode process is performed in the situation where unfavorable changes occur in sound quality to perform an appropriate receiving process.

The present disclosure contains subject matter related to that disclosed in Japanese Priority Patent Application JP 2011-044667 filed in the Japan Patent Office on Mar. 2, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A receiving device comprising:
    a receiving unit configured to receive a transmission signal of audio data sampled by a first clock from a transmitting device, and configured to receive an instruction signal for causing the receiving device to execute at least one of:
        demodulating the audio data from the received transmission signal with a second clock asynchronous with the first clock and having a same frequency as the first clock, or
        re-sampling the audio data obtained from the transmission signal received in the receiving unit with respect to the second clock;
    a received data processing unit configured to selectively execute, based on the received instruction signal, a selected at least one of
        an asynchronous mode process for executing demodulation of the audio data with respect to the transmission signal received in the receiving unit with the second clock and outputting demodulated audio data, or
        a re-sampling mode process for re-sampling the audio data obtained from the transmission signal received in the receiving unit with respect to the second clock and outputting re-sampled audio data; and
    a control unit configured to control the received data processing unit to execute the selected at least one of the asynchronous mode process or the re-sampling mode process based on the received instruction signal.

2. The receiving device according to claim 1, wherein the control unit is configured to control the received data processing unit to execute at least the selected at least one of the asynchronous mode process and the re-sampling mode process in accordance with reception of instruction information from the transmitting device.

3. The receiving device according to claim 1, wherein the control unit is configured to control the received data processing unit to execute the selected at least one of the asynchronous mode process or the re-sampling mode process in accordance with a result of determining a type of the audio data that is obtained from the transmission signal received in the receiving unit.

4. The receiving device according to claim 3, wherein the control unit is configured to, in response to a determination that a type of the audio data is single frequency data, make the received data processing unit execute the re-sampling mode process and configured to, in response to a determination that a type of the audio data is normal audio data, make the received data processing unit execute the asynchronous mode process.

5. The receiving device according to claim 3, wherein the control unit is configured to, in response to a determination that a type of the audio data is normal audio data, make the received data processing unit execute the re-sampling mode process and configured to, in response to a determination that a type of the audio data is audio data for measuring frequency characteristics, make the received data processing unit execute the asynchronous mode process.

6. The receiving device according to claim 1, wherein the control unit is configured to, in a case that an AGC process for the audio data is in an on state, make the received data processing unit execute the re-sampling mode process and configured to, in a case that the AGC process is in an off state, make the received data processing unit execute the asynchronous mode process.

7. A transmitting device comprising:
    a transmitted data processing unit to output a transmission signal, the transmission signal including instruction information that is a switching instruction between
        an asynchronous mode process for performing modulation of audio data that is sampled with a first clock, which is asynchronous with a second clock and has a same frequency as the second clock on a receiving device to generate a transmission signal and performing demodulation of the audio data with the second clock as instruction information to the receiving device side to output the demodulated audio data, and
        a re-sampling mode process for performing re-sampling with respect to the audio data obtained from the received transmission signal and outputting the audio data re-sampled with the second clock; and
    a transmitting unit configured to transmit the transmission signal obtained from the transmitted data processing unit to the receiving device.

8. The transmitting device according to claim 7, further comprising a determination unit configured to determine a type of the audio data that is transmitted as the transmission signal, wherein the received data processing unit includes instruction information for instructing any one of the asynchronous mode process and the re-sampling mode process in the transmission signal in accordance with a result of determination.

9. The transmitting device according to claim 8, wherein the received data processing unit is configured to, in response to the determination unit determining that the type of the audio data is single frequency data, include the instruction information for instructing the re-sampling mode process in the transmission and configured to, in response to the determination unit determining that the type of the audio data is normal audio data, include the instruction information for instructing the asynchronous mode process in the transmission signal.

10. The transmitting device according to claim 8, wherein the received data processing unit is configured to, in response to the determination unit determining that the type of the audio data is normal audio data, include the instruction information for instructing the re-sampling mode process in the transmission signal and is configured to, in response to the determination unit determining that the type of the audio data is audio data for measuring frequency characteristics, include the instruction information for instructing the asynchronous mode process in the transmission signal.

11. The transmitting device according to claim 7, wherein the received data processing unit includes instruction information for instructing an on/off operation of an AGC process on the receiving device side as instruction information that becomes the switching instruction, in the transmission signal.

12. A receiving method of a receiving device receiving a transmission signal of audio data sampled by a first clock from a transmitting device using a second clock which is asynchronous with the first clock and has the same frequency as a first clock, the receiving method comprising:
receiving, from the transmitting device, a control signal configured to cause execution of at least a selected one of
an asynchronous mode process for executing demodulation of the audio data with respect to the received transmission signal with the second clock and outputting the demodulated audio data, or
a re-sampling mode process for performing re-sampling with respect to the audio data obtained from the received transmission signal and outputting the audio data re-sampled with the second clock; and
selectively executing, based on the control signal, the asynchronous mode process for executing demodulation of the audio data with respect to the received transmission signal with the second clock and outputting the demodulated audio data or the re-sampling mode process for performing re-sampling with respect to the audio data obtained from the received transmission signal and outputting the audio data re-sampled with the second clock.

13. A transmitting method of a transmitting device transmitting audio data sampled by a first clock which is asynchronous with a second clock and has a same frequency as the second clock on a receiving device side to the receiving device, the transmitting method comprising:

generating a transmission signal including instruction information that is a switching instruction between an asynchronous mode process for performing modulation of audio data that is sampled with the first clock to generate the transmission signal and performing demodulation of the audio data with the second clock as the instruction information to the receiving device side to output the demodulated audio data and a re-sampling mode process for performing re-sampling with respect to the audio data obtained from the received transmission signal and outputting the audio data re-sampled with the second clock.

14. A communication system comprising:
a transmitting device; and
a receiving device,
wherein the transmitting device includes
a transmitted data processing unit to output a transmission signal, the transmission signal including instruction information that is a switching instruction between
an asynchronous mode process for performing modulation of audio data that is sampled with a first clock which is asynchronous with a second clock and has a same frequency as the second clock on a receiving device to generate a transmission signal and performing demodulation of the audio data with the second clock as instruction information to the receiving device side to output the demodulated audio data and
a re-sampling mode process for performing re-sampling with respect to the audio data obtained from the received transmission signal and outputting the audio data re-sampled with the second clock; and
a transmitting unit configured to transmit the transmission signal obtained from the transmitted data processing unit to the receiving device, and
wherein the receiving device includes
a receiving unit configured to receive a transmission signal of audio data sampled by a first clock from a transmitting device;
a received data processing unit configured to selectively execute
an asynchronous mode process for executing demodulation of the audio data with respect to the transmission signal received in the receiving unit with a second clock and outputting the demodulated audio data, or
a re-sampling mode process for performing re-sampling with respect to the audio data obtained from the transmission signal received in the receiving unit and outputting the audio data re-sampled with the second clock; and
a control unit configured to control the received data processing unit to execute any one of the asynchronous mode process or the re-sampling mode process in accordance with reception of instruction information included in the transmission signal received by the receiving unit.

* * * * *